United States Patent
Wang et al.

(10) Patent No.: US 9,481,748 B2
(45) Date of Patent: Nov. 1, 2016

(54) ZIEGLER-NATTA CATALYST FOR HIGH TEMPERATURE POLYMERIZATION

(71) Applicant: NOVA CHEMICALS (INTERNATIONAL) S.A., Fribourg (CH)

(72) Inventors: Qinyan Wang, Calgary (CA); Helena Ouskine, Calgary (CA); Mohamed Aiffa, Calgary (CA); Amy Baltimore, Calgary (CA); Holly Severin, Calgary (CA); Perry Dewit, Calgary (CA); Steven Clemens, Calgary (CA); Lawrence Martin Josef Van Asseldonk, Sarnia (CA); Isam Jaber, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 93 days.

(21) Appl. No.: 14/457,565

(22) Filed: Aug. 12, 2014

(65) Prior Publication Data

US 2016/0046745 A1    Feb. 18, 2016

(51) Int. Cl.
*C08F 210/16* (2006.01)
*C08J 5/00* (2006.01)

(52) U.S. Cl.
CPC .............. *C08F 210/16* (2013.01); *C08J 5/00* (2013.01); *C08J 2323/08* (2013.01)

(58) Field of Classification Search
None
See application file for complete search history.

(56) References Cited

U.S. PATENT DOCUMENTS

| 4,563,437 | A | * | 1/1986 | Shigetomi | C08F 10/00 502/105 |
| 4,843,049 | A | * | 6/1989 | Invernizzi | C08F 10/02 502/111 |
| 5,376,439 | A |   | 12/1994 | Hodgson et al. | |
| 5,589,555 | A |   | 12/1996 | Zboril et al. | |
| 7,666,810 | B2 |  | 2/2010 | Wang | |

OTHER PUBLICATIONS

Hadian et al., "Storage time effect on dynamic structure of MgCl2 . nEtOH adducts in heterogeneous Ziegler-Natta catalysts," Polyolefins J., vol. 1, No. 1 (2014) 33-41.*
Chien, James C.W., Weber, Siegfried and Hu, Youliang; Magnesium Chloride Supported Catalysts for Olefin Polymerization. XIX. Titanium Oxidation States, Catalyst Deactivation, and Active Site Structure; Journal of Polymer Science: Part A: Polymer Chemistry, vol. 27, (1989), pp. 1499-1514.
Chien, James C.W., Wu, Jiun-Chen; Magnesium-Chloride-Supported High-Mileage Catalysts for Olefin Polymerization. III. Electron Paramagnetic Resonance Studies; Journal of Polymer Science: Polymer Chemistry Edition, vol. 20, (1982), pp. 2461-2476.
Natta, G, Coradini, P. and Allegra, G.; The Different Crystalline Modification of TiCl3, a Catalyst Component for the Polymerization of alpha-Olefins. I: alpha-, beta-, gamma-TiCl3. II: delta-TiCl3; Journal of Polymer Science, vol. 51, (1961) pp. 399-410.

(Continued)

*Primary Examiner* — Ling Choi
*Assistant Examiner* — Catherine S Branch
(74) *Attorney, Agent, or Firm* — Julie L. Heinrich

(57) ABSTRACT

The various embodiments of the invention provide, a magnesium titanium polymerization procatalyst, methods for making and using the same.

30 Claims, 6 Drawing Sheets

Anhydrous alpha MgCl₂

(56) References Cited

OTHER PUBLICATIONS

Deslauriers, Paul J., Rohlfing, David C. and Hsieh, Eric T.; Quantifying short chain branching microstructures in ethylene 1-olefin copolymers using size exclusion chromatography and Fourier transform infrared spectroscopy (SEC-FTIR); Polymer 43 (2002), pp. 159-170.

Stoll, Stefan and Schweiger, Arthur; EasySpin, a comprehensive software package for spectral simulation and analysis in EPR; Journal of Magnetic Resonance 178 (2006); pp. 42-55.

* cited by examiner

Anhydrous alpha MgCl₂

GPC-FT-IR for the product 5

EPR spectrum of comparative example A

ZIEGLER-NATTA CATALYST FOR HIGH TEMPERATURE POLYMERIZATION

Magnesium-titanium catalysts for olefin polymerization are in wide commercial use. In general, these catalysts comprise a magnesium halide component (typically, magnesium dichloride) and a titanium component that is deposited on the magnesium dichloride.

The resulting magnesium-titanium complex is often referred to as a "procatalyst" because it requires a co-catalyst or an activator to produce a highly reactive polymerization catalyst system.

The procatalyst may be first synthesized then added to the polymerization reactor at a later time. Alternately, the procatalyst may be prepared by an 'in-line mixing technique' (adjacent to a polymerization reactor) and added directly to the reactor.

Many of the original Ziegler-Natta catalysts are not sufficiently active to permit the catalyst residues to be left in the polymer without causing quality problems (such as polymer color and a propensity to degrade/oxidize the polymer in an undesirably short time period). Accordingly, there is a need for "high activity leave-in" catalysts, which are characterized by having less problematic catalyst residues that may be left in the finished polymer.

A need exists for a highly active magnesium-titanium catalyst for use in high temperature solution polymerizations of polyolefins that can provide increased comonomer incorporation and higher molecular weight polymeric materials with lower residual titanium and halogen impurities.

Some embodiments of the invention provide a procatalyst for polymerization of ethylene and α-olefins, the procatalyst comprising at least 0.2% of a species detectable by EPR having a g value of 1.950.

Some embodiments of the invention provide a procatalyst for polymerization of ethylene and α-olefins on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from about 0.33 to about 1.0; each $R^4$ and $R^5$ is independently selected from $C_{1-8}$ alkyl; each X is independently selected from the halogen radicals; and further wherein at least 60% of the total Ti present is in the $Ti^{3+}$ oxidation state.

Other embodiments of the invention provide a process to prepare an olefin polymerization procatalyst comprising a $Ti^{3+}$ complex, said process comprising: a) forming a delta form $MgCl_2$ species by combining i) $R_2Mg$ in a solvent selected from $C_{5-12}$ alkanes, and ii) reactive organic chloride or HCl, wherein each R is independently selected from $C_{2-8}$ alkyl, and wherein the mole ratio of Cl and Mg added is from about 2.0 to about 3.0; b) adding to said delta form $MgCl_2$ species prepared in step a $R^1_xAlX_{3-x}$ and a tetravalent titanium compound in any order or at the same time, wherein the Al/Ti molar ratio is from about 3 to about 10; or c) adding to said delta form $MgCl_2$ species prepared in step a $R^1_xAlX_{3-x}$ first, a tetravalent titanium compound second, followed by an $R^4_yAlOR^5_{3-y}$, wherein the Al/Ti molar ratio when measuring Al supplied from $R^1_xAlX_{3-x}$ only is from about 0.7 to about 2 and the Al/Ti molar ratio when measuring Al supplied from $R^4_yAlOR^5_{3-y}$ is from about 1 to about 2; and further wherein the Mg/Ti molar ratio is from about 5 to about 10; x is 1 or 2; y is 1 or 2; each $R^1$ is independently selected from $C_{1-8}$ alkyl; the tetravalent titanium compound is selected from $TiR^2X_3$, $Ti(OR^3)X_3$, $TiX_4$, and mixtures thereof; each X is independently selected from the halogen radicals; each $R^2$ is independently selected from $C_{1-8}$ alkyl and benzyl, and each $R^3$, $R^4$ and $R^5$ are independently selected from $C_{1-8}$ alkyl.

Other embodiments of the invention provide a procatalyst product comprising a $Ti^{3+}$ complex prepared by a process comprising: a) forming a delta form $MgCl_2$ species by combining i) $R_2Mg$ in a solvent selected from $C_{5-12}$ alkanes, and ii) reactive organic chloride or HCl, wherein each R is independently selected from $C_{2-8}$ alkyl, and wherein the mole ratio of Cl and Mg added is from about 2.0 to about 3.0; b) adding to said delta form $MgCl_2$ species prepared in step a $R^1_xAlX_{3-x}$ and a tetravalent titanium compound in any order or at the same time, wherein the Al/Ti molar ratio is from about 3 to about 10; or c) adding to said delta form $MgCl_2$ species prepared in step a $R^1_xAlX_{3-x}$ first, a tetravalent titanium compound second, followed by an $R^4_yAlOR^5_{3-y}$, wherein the Al/Ti molar ratio when measuring Al supplied from $R^1_xAlX_{3-x}$ only is from about 0.7 to about 2 and the Al/Ti molar ratio when measuring Al supplied from $R^4_yAlOR^5_{3-y}$ is from about 1 to about 2; and further wherein the Mg/Ti molar ratio is from about 5 to about 10; x is 1 or 2; y is 1 or 2; each $R^1$ is independently selected from $C_{1-8}$ alkyl; the tetravalent titanium compound is selected from $TiR^2X_3$, $Ti(OR^3)X_3$, $TiX_4$, and mixtures thereof; each X is independently selected from the halogen radicals; each $R^2$ is independently selected from $C_{1-8}$ alkyl and benzyl, and each $R^3$, $R^4$ and $R^5$ are independently selected from $C_{1-8}$ alkyl.

Other embodiments of the invention provide a solution olefin polymerization process comprising i) adding to a continuous stirred tank reactor (CSTR) optionally with one or more additional reactors, a solvent selected from $C_{5-12}$ alkanes and a procatalyst for polymerization on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from 0.33 to 1.0; each $R^4$ and $R^5$ is independently selected from $C_{1-8}$ alkyl radicals; each X is independently selected from the halogen radicals; wherein at least 60% of the total Ti present is in the $Ti^{3+}$ oxidation state; ii) adding ethylene, hydrogen and optionally one or more comonomers selected from $C_{3-8}$ comonomers to the reactor; and iii) adding an aluminum alkyl activator to the reactor in a molar ratio of about 1 to about 10 relative to the amount of procatalyst.

Other embodiments of the invention provide an olefin polymerization product prepared by a polymerization process comprising i) adding to a continuous stirred tank reactor (CSTR) optionally with one or more additional reactors, a solvent selected from $C_{5-12}$ alkanes and a procatalyst for polymerization on a delta form $MgCl_2$ support comprising a $Ti^{3+}$ complex of the formula $TiCl_3*[[R^4]_a[R^5O]_bAlX_{3-c}]_d$ wherein a is 0 to 1; b is 0 to 1; c=a+b; d is from 0.33 to 1.0; each $R^4$ and $R^5$ is independently selected from $C_{1-8}$ alkyl radicals; each X is independently selected from the halogen radicals; wherein at least 60% of the total Ti present is in the $Ti^{3+}$ oxidation state; ii) adding ethylene, hydrogen and optionally one or more comonomers selected from $C_{3-8}$ comonomers to the reactor; and iii) adding an aluminum alkyl activator to the reactor in a molar ratio of about 1 to about 10 relative to the amount of procatalyst.

Other embodiments of the invention provide a plastic article selected from films, fibers, molded or thermoformed articles, and pipe coatings comprising an olefin polymerization product prepared by a polymerization process comprising i) adding to a continuous stirred tank reactor (CSTR) optionally with one or more additional reactors, a solvent selected from $C_{5-12}$ alkanes and a procatalyst for polymerization on a delta form $MgCl_2$ support comprising a $Ti^{3+}$ complex of the formula TiCl$_3$*[[R$^4$]$_a$[R$^5$O]$_b$AlX$_{3-c}$]$_d$ wherein a is 0 to 1; b is 0 to 1; c=a+b; d is from 0.33 to 1.0; each R$^4$ and R$^5$ is independently selected from C$_{1-8}$ alkyl radicals; each X is independently selected from the halogen radicals; wherein at least 60% of the total Ti present is in the Ti$^{3+}$ oxidation state; ii) adding ethylene, hydrogen and optionally one or more comonomers selected from C$_{3-8}$ comonomers to the reactor; and iii) adding an aluminum alkyl activator to the reactor in a molar ratio of about 1 to about 10 relative to the amount of procatalyst.

Figure 1:
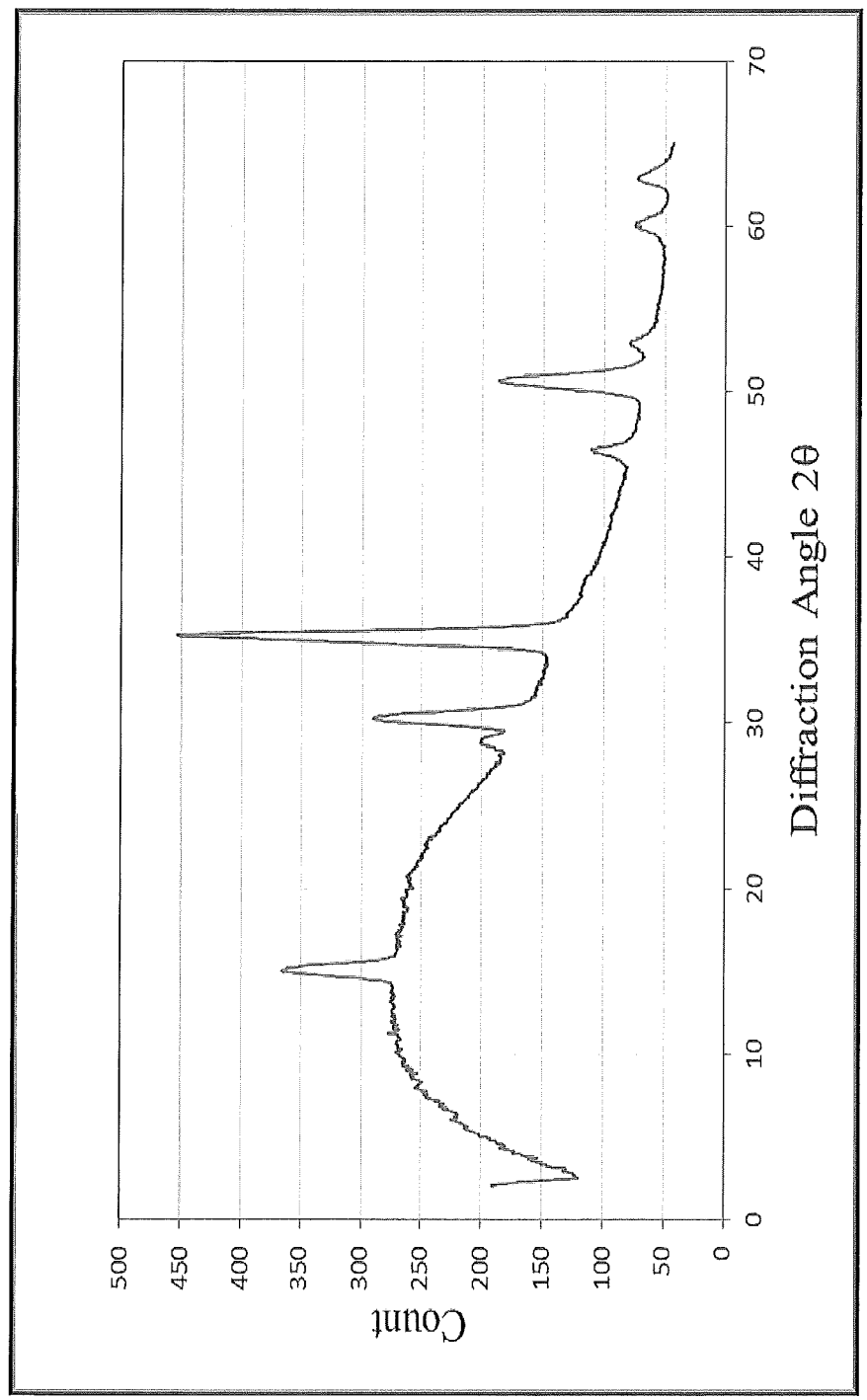
FIG. 1 shows the typical XRD spectrum from the alpha form of MgCl$_2$.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

It must be noted that as used herein, and in the appended claims, the singular forms "a," "an," and "the" include plural references unless the context clearly dictates otherwise.

Unless defined otherwise, all technical, and scientific terms used herein have the same meanings as commonly understood by one of ordinary skill in the art to which this invention belongs.

The terms "alkyl" "alkyl group" and "alkyl radical" can be used interchangeably and refer to saturated monovalent straight or branched chain and cyclic hydrocarbyl groups or radicals bonded to one or more other moieties. For example, the alkyl could be bonded to an oxygen atom to form an alkoxy group, or to a metal as part of or as the ligand on that metal. The term "alkyl" is exemplified by groups such as methyl, ethyl, n-propyl, iso-propyl, n-butyl, t-butyl, n-pentyl, adamantyl, cyclopropyl, cyclobutyl, cyclopentyl, cyclohexyl, cyclooctyl, and the like.

The term "alkanes" refers to non-aromatic, saturated hydrocarbon molecules with the general formula C$_n$H$_{(2n+2)}$, wherein n is an integer. Alkanes, for example, may be used as solvents or gas feeds.

When a term is preceded by C$_{x-y}$ where x and y are integers, the group is limited to from x to y carbon atoms within the group, excluding any substituents referred to as substituting groups. For example, the C$_{1-5}$ alkyl radicals would include (but not be limited to) methyl, iso-propyl, n-butyl, t-butyl, cyclopropyl, and cyclopentyl radicals, where C$_{1-5}$ alkane would include (but not be limited to) methane, ethane, pentane, cyclopentane, and the like.

The term "halogen radical" or "halogen" or "halo" can be used interchangeably and refer to fluoride, chloride, bromide or iodide groups.

The Procatalyst

In one embodiment, the invention described herein is a procatalyst for polymerization of ethylene and α-olefins on a delta form MgCl$_2$ support comprising a Ti$^{3+}$ complex of the formula TiCl$_3$*[[R$^4$]$_a$[R$^5$O]$_b$AlX$_{3-c}$]$_d$ wherein a is 0 to 1; b is 0 to 1; c=a+b; d is from 0.33 to 1.0; each R$^4$ and R$^5$ is independently selected from C$_{1-8}$ alkyl radicals; each X is independently selected from the halogen radicals; and wherein at least 60% of the total Ti present is in the Ti$^{3+}$ oxidation state.

While X can be any halogen, in some embodiments X is Br or Cl. In other embodiments X is Cl.

In some embodiments c is 0. In other embodiments c is 1.

In some embodiments a is 0 and b is 1. In some embodiments a is 1 and b is 0. In some embodiments a is 1 and b is 1. In some embodiments a is 0 and b is 0.

In some embodiments each R$^5$ is C$_{1-4}$alkyl. In other embodiments, each R$^5$ is ethyl.

In some embodiments each R$^4$ is C$_{1-4}$alkyl. In other embodiments, each R$^4$ is ethyl.

Magnesium/Titanium Mole Ratio

It will be recognized by those skilled in the art of magnesium-titanium polymerization catalysts that the catalyst activity can be influenced by the magnesium/titanium mole ratio. Preferred mole Mg/Ti ratios are from 5/1 to 10/1 for the catalysts of the present invention, i.e. from 5 to 10 moles of Mg are preferably present per mole of Ti in the catalyst.

In some embodiments, the Mg/Ti molar ratio is from about 5 to about 8. In other embodiments, the Mg/Ti ratio is from about 6 to about 8. The desired Mg/Ti molar ratio can be obtained by preparing the procatalyst according to the methods described herein. The procatalyst formula and ratio of elements contained therein can be determined using standard elemental analysis techniques including but not limited to classical "wet chemistry," neutron activation, Inductively Coupled Plasma-Mass Spectrometry (ICP-MS) and x ray diffraction spectroscopy (XRD).

Catalyst samples can be analyzed for titanium valence distribution using the redox titration method for titanium valence distribution (see J. C. W. Chien et. al, *J. Polym. Sci. Part A: Polym Chem.* 1989, 27, 1499-1514) or using an ultraviolet (UV) method for titanium content analysis based on ASTM standard E878-01.

In some embodiments at least 70% of the total Ti present is in the $Ti^{3+}$ oxidation state. In other embodiments at least 80% of the total Ti present is in the $Ti^{3+}$ oxidation state.

The characterization of solid Ziegler catalyst can be achieved by electron paramagnetic resonance spectroscopy (EPR), to which a part of titanium atoms in oxidation state +3 is sensitive. The g value assignments were based on the publication of J. C. W. Chien et. al, *J. Polym. Sci. Part A: Poly. Chem.* 1982, 20, 2461-2476. Upon examining the EPR spectra of the Ziegler catalysts described herein and their corresponding simulated spectra, three groups of EPR peaks were observed and assigned to species A, B and C. Species A with g values of 1.910, 1.898, 1.955 is believed to be a species with the two chlorides from $MgCl_2$ coordinated to a $TiCl_3$ (this complex is believed to be similar to that assigned as Species A in the Chien (1982) reference). Species B is ill defined as the peak is very broad. When Species C is present with a g value of 1.950, it is believed to be a species with a single Cl from $MgCl_2$ coordinated to Al (this complex is believed to be similar to that assigned as Species F, in the Chien (1982) reference); whereas when Species C is present and instead has a g value of 1.969, it is believed to be a species with a single Cl from $MgCl_2$ coordinated to Ti (this complex is believed to be similar to that assigned to be Species E, in the Chien (1982) reference).

Figure 4:
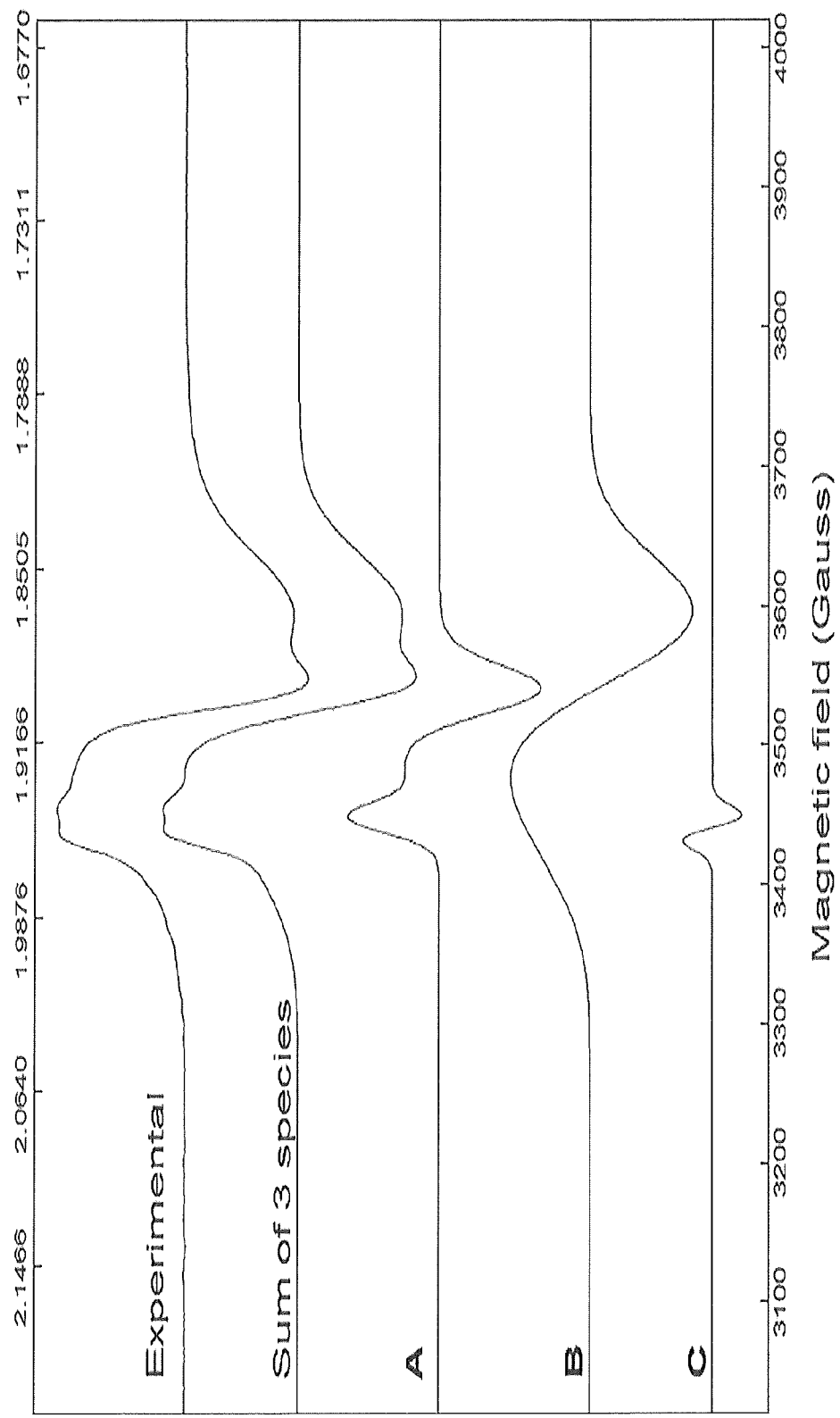
FIG. 4 shows the EPR spectrum and simulation of catalyst 1.
Figure 5:
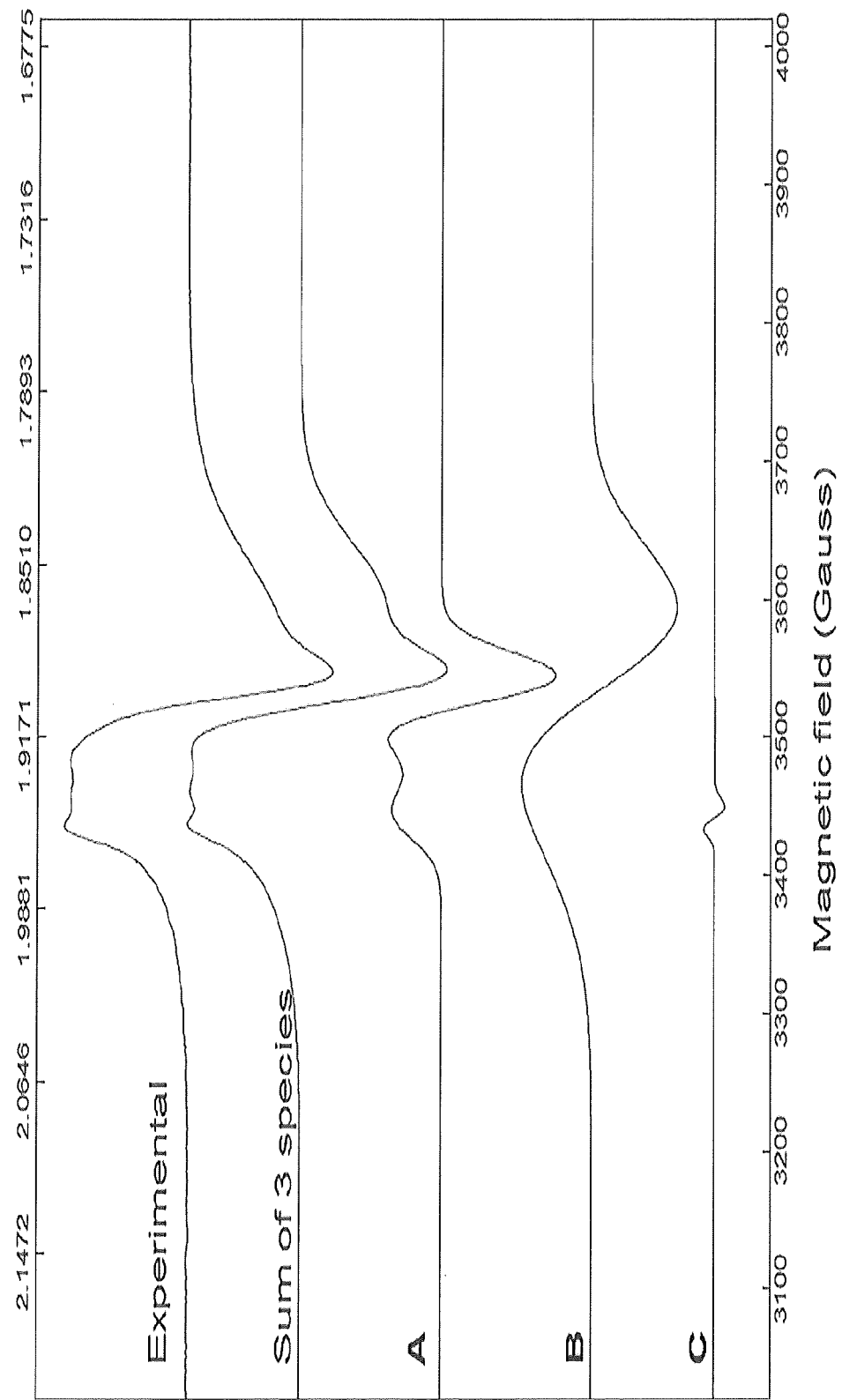
FIG. 5 shows the EPR spectrum and simulation of catalyst 2b.

In one embodiment the solid component of procatalyst described herein contains at least 0.2%, or for example, from about 0.2 to about 1% of species C with g value of 1.950, in the sense indicated in FIGS. 4 and 5. It is believed this species C has a tetrahedral configuration at Ti. In other embodiments, the procatalyst has from about 0.2 to about 0.5% of species C with g value of 1.950, or from about 0.5 to about 1% of species C with g value of 1.950.

Figure 6:
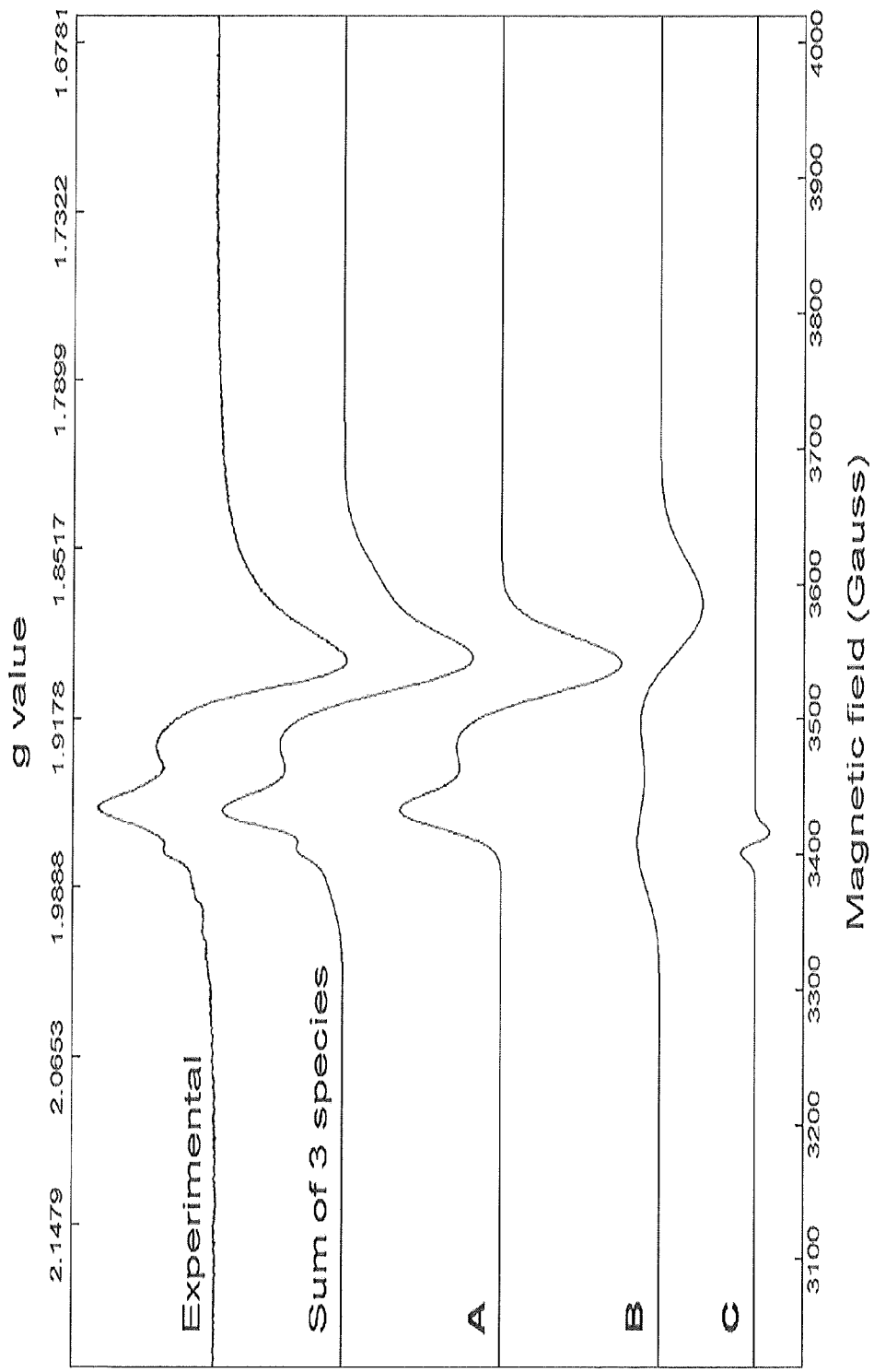
FIG. 6 shows the EPR spectrum and simulation of comparative example A.

In comparison, solid components of comparative example A were obtained using other known preparation methods and that are described in U.S. Pat. No. 7,666,810 B2. EPR analysis and simulation of Comparative example A shows the presence of a species C with a g value of 1.969, (Shown in FIG. 6) which can be assigned to be a triangular bipyramidal configuration at Ti. Without wishing to be bound to any particular theory of explanation, it has been found that when Species C is present with a g value of 1.969, the procatalyst displays less advantageous properties in the polymerization activity of the olefins and in terms of molecular weight of the polymer produced in high temperature polymerization processes as compared to the procatalyst when Species C is present with a g value of 1.950.

In one embodiment the procatalyst is a $Ti^{3+}$ complex of the formula $TiCl_3*[OEtAlCl_2]_d$, and the Mg/Ti molar ratio is from about 5 to about 8. In another embodiment the procatalyst is a $Ti^{3+}$ complex of the formula $TiCl_3*[ClAlCl_2]_d$, and the Mg/Ti ratio is from about 5 to about 8. In some embodiments, partially alkylated versions of $TiCl_3*[ClAlCl_2]_d$ or $TiCl_3*[OEtAlCl_2]_d$ may be present.

Another embodiment the invention described herein provides a process to prepare an olefin polymerization procatalyst comprising a $Ti^{3+}$ complex, said process comprising: a) forming a delta form $MgCl_2$ species by combining i) $R_2Mg$ in a solvent selected from $C_{5-12}$ alkanes, and ii) reactive organic chloride or HCl; wherein each R is independently selected from $C_{2-8}$ alkyl; and wherein the mole ratio of added Cl to Mg is from about 2.0 to about 3.0; then alternatively adding either b) to said delta form $MgCl_2$ species prepared in step a) an alkyl aluminum halide of the formula $R^1_xAlX_{3-x}$ and a tetravalent titanium compound in any order or at the same time, to provide a Al/Ti molar ratio is from about 3 to about 10; or c) to said delta form $MgCl_2$ species prepared in step a) an aluminum alkyl halide of the formula $R^1_xAlX_{3-x}$ first and a tetravalent titanium compound second, then an alkyl aluminum alkoxide of the formula $R^4_yAlOR^5_{3-y}$ in a final addition step, wherein the Al/Ti molar ratio when measuring Al supplied from $R^1_xAlX_{3-x}$ is from about 0.7 to about 2 and the Al/Ti molar ratio when measuring Al supplied from $R^4_yAlOR^5_{3-y}$ is from about 1 to about 2; and further wherein the Mg/Ti molar ratio is from about 5 to about 10, x is 1 or 2, y is 1 or 2, each $R^1$ is independently selected from $C_{1-8}$ alkyl, the tetravalent titanium compound is selected from $TiR^2X_3$, $Ti(OR^3)X_3$, $TiX_4$, and mixtures thereof, each X is independently selected from the halogens, each $R^2$ is independently selected from $C_{1-8}$ alkyl and benzyl, and each $R^3$, $R^4$ and $R^5$ are independently selected from $C_{1-8}$ alkyl.

Another embodiment of the invention described herein provides a procatalyst product prepared by a process comprising: a) forming a delta form $MgCl_2$ species by combining i) $R_2Mg$ in a solvent selected from $C_{5-12}$ alkanes, and ii) reactive organic chloride (RCl) or HCl; wherein each R is independently selected from $C_{2-8}$ alkyl; and wherein the mole ratio of Cl to Mg added is from about 2.0 to about 3.0; then alternatively adding either b) to said delta form $MgCl_2$ species prepared in step an alkyl aluminum halide of the formula $R^1_xAlX_{3-x}$ and a tetravalent titanium compound in any order or at the same time, wherein the Al/Ti molar ratio is from about 3 to about 10; or c) to said delta form $MgCl_2$ species prepared in step a) an aluminum alkyl halide of the formula $R^1_xAlX_{3-x}$ first and a tetravalent titanium compound second, then an alkyl aluminum alkoxide of the formula $R^4_yAlOR^5_{3-y}$ in a final addition step, wherein the Al/Ti molar ratio when measuring Al supplied from $R^1_xAlX_{3-x}$ is from about 0.7 to about 2 and the Al/Ti molar ratio when measuring Al supplied from $R^4_yAlOR^5_{3-y}$ is from about 1 to about 2; and further wherein the Mg/Ti molar ratio is from about 5 to about 10, x is 1 or 2, y is 1 or 2, each $R^1$ is independently selected from $C_{1-8}$ alkyl, the tetravalent titanium compound is selected from $TiR^2X_3$, $Ti(OR^3)X_3$, $TiX_4$, and mixtures thereof, each X is independently selected from the halogens, each $R^2$ is independently selected from $C_{1-8}$ alkyl and benzyl, and each $R^3$, $R^4$ and $R^5$ are independently selected from $C_{1-8}$ alkyl.

Diorganomagnesium

Diorganomagnesium compounds are well known and are commercially available. Diorganomagnesium compounds may be generally represented by the formula $MgR_2$ wherein each R is selected from the $C_{2-8}$ hydrocarbyl groups. In one embodiment each R is independently selected from linear $C_{2-8}$ alkyl groups including, but not limited to, ethyl, butyl, hexyl and octyl groups. In another embodiment each R is independently selected from $C_{2-4}$ alkyl groups. In another embodiment each R is independently selected from ethyl and butyl groups. In one embodiment $MgR_2$ is selected from butylethyl magnesium (BEM), dibutyl magnesium, and butyloctyl magnesium (BOM). In another embodiment $MgR_2$ is butylethyl magnesium (BEM).

Diorganomagnesium solutions are commercially available materials sold by Albemarle. Other diorganomagnesium compounds include hydrocarbon solutions of butyl ethyl magnesium or dibutyl magnesium (which may optionally be treated with an organoaluminum compound to improve solubility and/or reduce solution viscosity).

In one embodiment the $MgR_2$ is provided in a solvent selected from $C_{5-12}$ alkanes. In one embodiment the solvent is selected from hexane, cyclohexane, decane, heptane, isohexane, and dodecane, and mixtures thereof. In one embodiment the solvent is isohexane. In one embodiment the solvent is decane. In one embodiment the solvent is heptane.

Chlorine Amount and Chlorine Source

The use of magnesium dichloride in "magnesium-titanium" polymerization catalysts is well known. The $MgCl_2$ is generally regarded as a support for the titanium species.

The reaction of a diorganomagnesium compound with two mole equivalents of chlorine to produce magnesium dichloride is a well-known method to prepare catalyst supports.

Embodiments of the present invention use a magnesium dichloride support that is prepared by the reaction of diorganomagnesium compound (described above) with 2 to 3 mole equivalents of chlorine.

In one embodiment, the chlorine/magnesium ratio in the support is from about 2.15 to about 3.0 per mole of magnesium (based on the amount of magnesium in the starting diorganomagnesium compound), or from about 2.15 to about 2.5.

The source of chlorine reacts substantially spontaneously with the diorganomagnesium and is a reactive organic chloride or HCl. In one embodiment the reactive organic chloride is a $C_{4-10}$ tertiary alkyl chloride. In one embodiment the reactive organic chloride is tertiary butyl chloride. In one embodiment the source of chlorine is HCl.

Reaction temperatures may range from about 20° C. to about 160° C., or from about 40° C. to about 100° C. or from about 50° C. to 90° C. or from about 40° C. to about 90° C.

The $MgCl_2$ species prepared as disclosed herein is in the delta form, as determined by measuring the half-height of peaks of an X-ray diffraction measurement. The delta form is known by those skilled in the art to be a highly disordered mixture of alpha and beta forms of $MgCl_2$. XRD spectroscopy is particularly useful in determining the structure of the $MgCl_2$ support characterized by an X-ray spectrum typical of a structure characterized by rototranslational disorder (see for example G. Natta et al. *J. Polym. Sci.* 1961, 51, 399-410).

Figure 2:
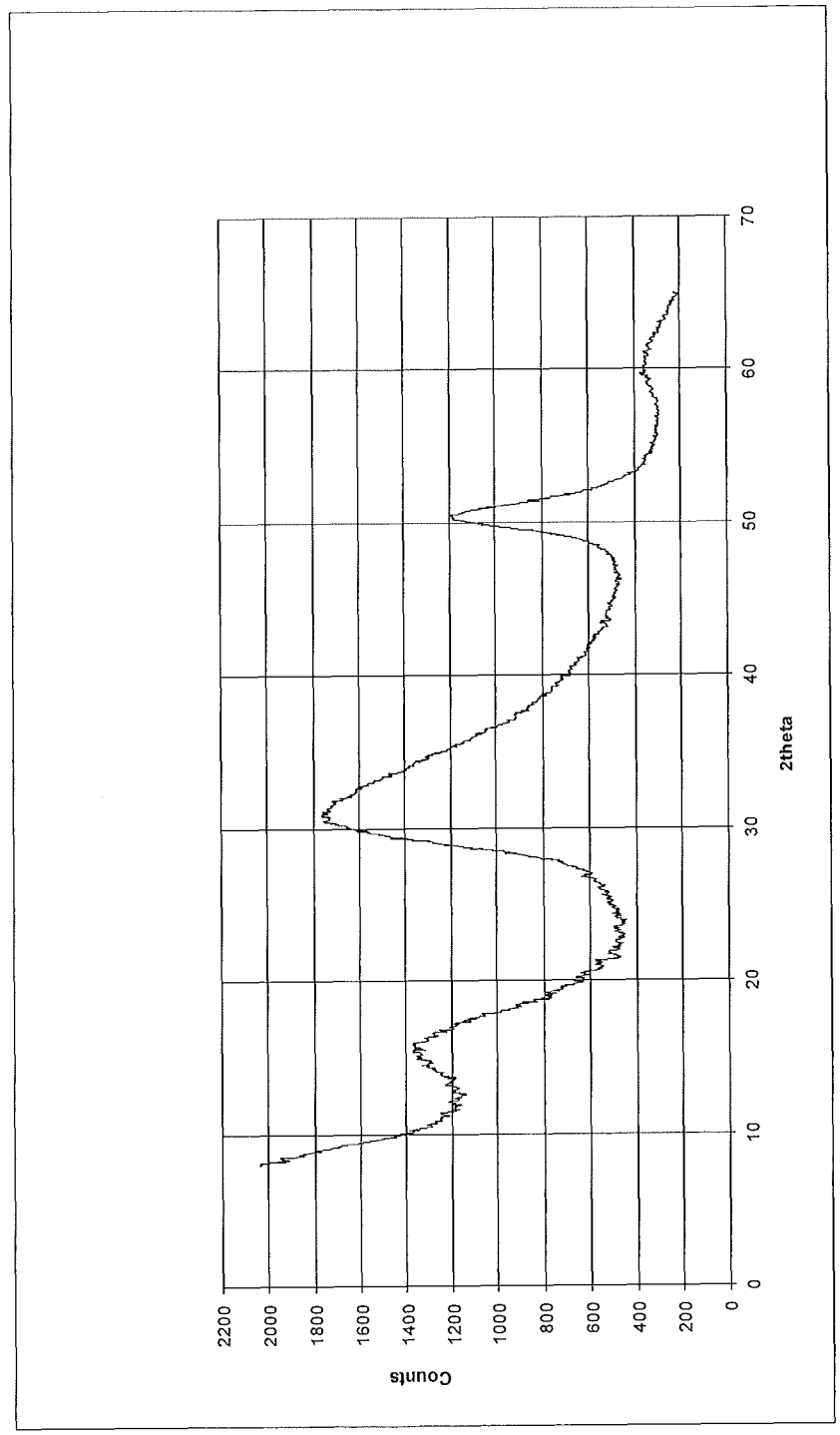
FIG. 2 shows the XRD pattern for the delta form of MgCl$_2$ formed using processes disclosed and claimed herein.
Figure 3:
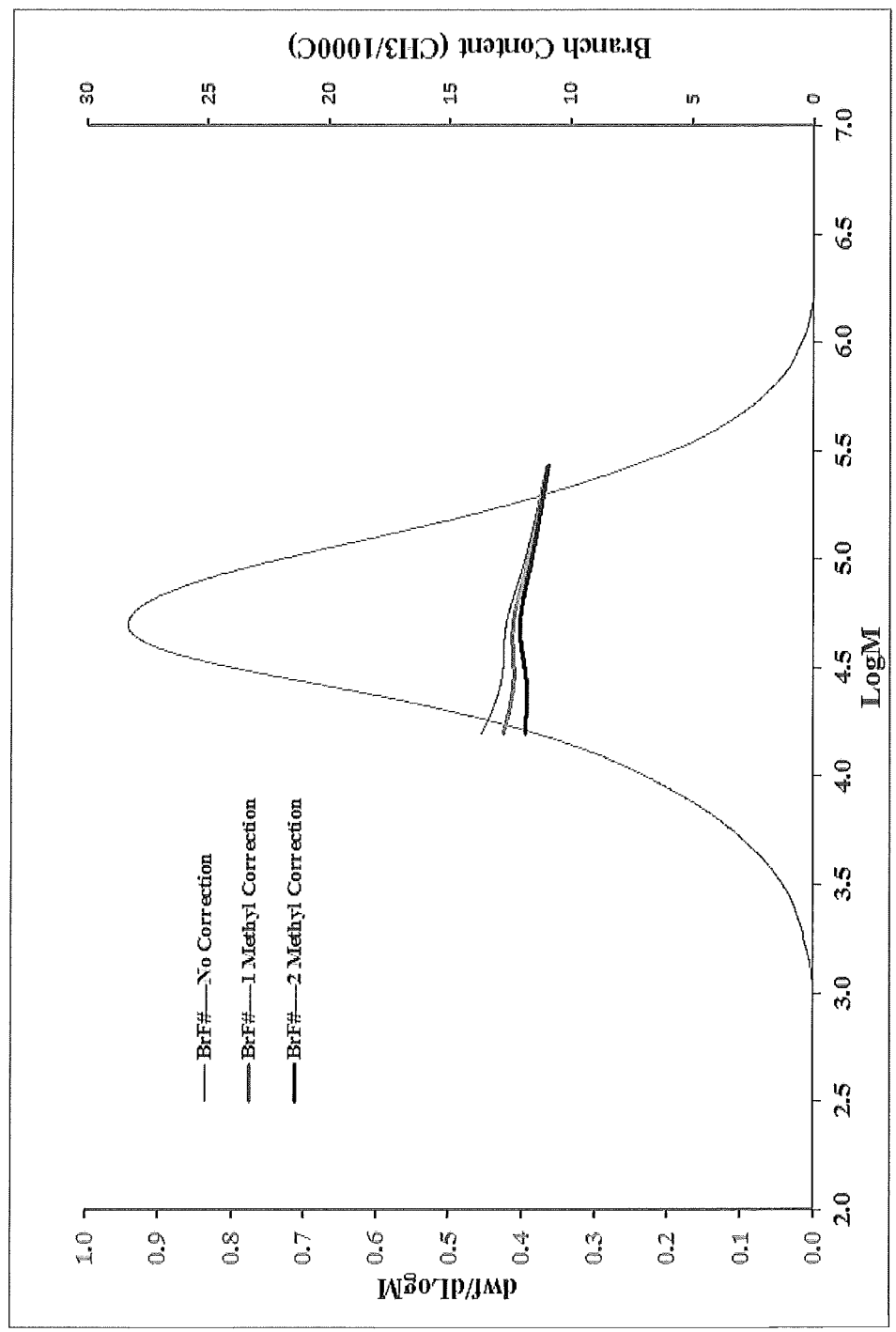
FIG. 3 shows GPC-FT-IR for the product 5.

FIG. 1 shows the typical XRD spectrum from the alpha form of $MgCl_2$. FIG. 2 shows the XRD pattern for the delta form of $MgCl_2$ formed using processes disclosed and claimed herein.

In some embodiments of the invention described herein, an advantage of the processes used to prepare the $MgCl_2$ species allow for the next steps of the procatalyst formation to follow without the need for intervening washing steps if that is desired. The deleterious effects of residual diorganomagnesium starting material are minimized by reacting starting materials to meet the disclosed mole ratios of Cl to Mg or by treatment of the $MgCl_2$ with an additional chlorine source, for example isobutylAlCl$_2$.

Titanium IV Source

The procatalyst described herein is then prepared by depositing a titanium compound on the above described magnesium chloride support. The starting titanium (IV) compound may be selected from compounds of the formula $TiR^2X_3$, $Ti(OR^3)X_3$, $TiX_4$, and mixtures thereof, wherein each $R^2$ is selected from $C_{1-8}$ alkyl and benzyl, and $R^3$ is selected from $C_{1-8}$ alkyl and each X is independently a halogen.

In some embodiments the halogen is selected from chlorine and bromine. In other embodiments the halogen is chlorine. In some embodiments $R^3$ is selected from $C_{1-4}$ alkyl. In other embodiments $R^3$ is selected from ethyl, isopropyl, and t-butyl.

In some embodiments $R^2$ is selected from $C_{1-4}$ alkyl. In other embodiments, $R^2$ is selected from ethyl and isobutyl. In some embodiments $R^2$ is benzyl. In some embodiments, the tetravalent titanium compound is $Ti(OCH_2CH_3)Cl_3$, or $Ti(CH_2CH_3)Cl_3$. In some embodiments, the tetravalent titanium compound is selected from $TiCl_2Br_2$ and $TiCl_4$. In some embodiments, the tetravalent titanium compound is $TiCl_4$.

It will be understood by those skilled in the art that the $TiR^2X_3$, $Ti(OR^3)X_3$, $TiX_4$ species may be purchased or alternatively may be prepared by well-known reactions with commercially available and inexpensive alkyl titanium and alkoxy titanium compounds, such as $Ti(R^2)_2X_2$, $Ti(R^2)_3X_1$, $Ti(OR^3)_2X_2$, or $Ti(OR^3)_3X_1$, where each X, $R^2$ and $R^3$ are as described herein above.

The Aluminum Species

The aluminum compounds used in the methods described herein are purchased commercially from companies such as Albemarle, Sigma-Aldrich, or Fisher Chemical.

The $R^1{}_xAlX_{3-x}$ is used to halogenate the dialkylmagnesium compounds and the Grignard reagent and is added in the molar ratio amount specified above to minimize excess halogen in the solution and to minimize over reduction of the Ti species.

In some embodiments x is 1. In other embodiments x is 2.

In some embodiments each $R^1$ is independently selected from methyl, ethyl, propyl, isopropyl, butyl, and isobutyl. In other embodiments each $R^1$ is independently ethyl and isobutyl.

While X can be any halogen, in some embodiments, X is Cl or Br. In other embodiments, X is Cl.

In one embodiment of the process of making the procatalysts described herein $R^1{}_xAlX_{3-x}$ is selected from isobutylaluminum dichloride (IBADC), and ethylaluminumdichloride (EADC).

The $R^4{}_yAlOR^5{}_{3-y}$ is used to reduce the titanium species to the desired oxidation state and/or may react with excess halide. In addition, this compound may act as an activator for the polymerization reactions disclosed herein below.

The $R^1{}_xAlX_{3-x}$ described above can be used in addition to the $R^4{}_yAlOR^5{}_{3-y}$ species as a reducing agent. Other reduction agents include $AlR^*_3$, $AlR^*_2X$, to $AlR^*_1X_2$, where $R^*$ is $C_{2-8}$ alkyl groups. While $R^*$ may be higher alkyl groups, such aluminum species are not as commercially desirable. In some embodiments of the process of making the procatalysts described herein $R^1{}_xAlX_{3-x}$ is triisobutyl aluminum.

In some embodiments y is 2. In some embodiments y is 1.

In some embodiments each $R^4$ and $R^5$ are independently selected from $C_{1-4}$ alkyl. In other embodiments each $R^4$ and $R^5$ is ethyl.

In one embodiment of the process of making the procatalysts described herein $R^4{}_yAlOR^5{}_{3-y}$ is diethylaluminumethoxide (DEAL-E).

The preparation of the procatalyst by the subsequent additions of the aluminum and titanium species to the $MgCl_2$ species can be accomplished by alternative pathways. In one embodiment, reduction of the titanium species from $Ti^{4+}$ to $Ti^{3+}$ is accomplished using an $R^1{}_xAlX_{3-x}$ compound added in any order to or with the titanium compound. In some embodiments of this pathway, the Al/Ti molar ratio is from about 4 to 7. In other embodiments of this pathway, Al/Ti ratio is about 5.

In another alternative pathway, the titanium species is added after a smaller amount of the $R^1_x AlX_{3-x}$ compound (as compared to the amount of $R^1_x AlX_{3-x}$ compound used in the previously discussed pathway). The reduction to the $Ti^{3+}$ species is completed by the addition of the $R^4_y AlOR^5_{3-y}$ compound. In some embodiments of this pathway, the Al/Ti molar ratio is from about 1 to about 1.8 when measuring Al supplied from $R^1_x AlX_{3-x}$. In other embodiments of this pathway, the Al/Ti molar ratio is about 1 when measuring Al supplied from $R^1_x AlX_{3-x}$. In some embodiments of this pathway, the Al/Ti molar ratio is from about 0.7 to about 1.7, or from about 1.5 to 1.7, when measuring Al supplied from $R^4_y AlOR^5_{3-y}$. In other embodiments of this pathway, the Al/Ti molar ratio is about 1.67 when measuring Al supplied from $R^4_y AlOR^5_{3-y}$.

In either pathway discussed the reaction may be carried out at a temperature between about 40° C. and 90° C., or about 40° C. and about 70° C., or between about 45° C. and about 55° C. or at a temperature of about 50° C.

Electron Donors

The use of electron donors is well known in the art of magnesium-titanium based olefin polymerization catalysts. The optional use of an electron donor is encompassed by this invention. However, it is preferred not to use an electron donor when the catalyst is used under solution polymerization conditions. Suitable electron donors are well known to those skilled in the art and include tetrahydrofuran (THF), dimethyl formamide, ethyl acetate, methyl isobutyl ketone and various phthalates.

Activators

Any "activator" which activates the above described magnesium/titanium procatalyst for olefin polymerization may be employed in the present invention.

Exemplary activators include aluminoxanes and organoaluminum cocatalyst.

The aluminoxane may be of the formula:

$$(R^6)_2 AlO(R^6 AlO)_m Al(R^6)_2$$

wherein each $R^6$ is independently selected from the group consisting of $C_{1-20}$ hydrocarbyl radicals and m is from 0 to 50, preferably $R^6$ is a $C_{1-4}$ alkyl radical and m is from 5 to 30. Methylaluminoxane (or "MAO") in which each $R^6$ is methyl is the preferred aluminoxane.

Aluminoxanes are well known as cocatalysts, particularly for metallocene-type catalysts. Aluminoxanes are also readily available articles of commerce.

The use of an aluminoxane cocatalyst generally requires a mole ratio of aluminum to the transition metal in the catalyst from 25:1 to 1000:1. Example ratios useful in the methods disclosed herein are from 5:1 to 10:1.

Preferred organoaluminum compounds include triethyl aluminum, triisobutyl aluminum and diethyl-aluminum ethoxide. When using these organoaluminum activators, exemplary Al/Ti ratios are from 0.5/1 to 10/1, based on the moles of Ti in the procatalyst. Solution polymerization processes are preferably conducted with a comparatively low Al/Ti mole ratio (for example, 0.5/1 to 5/1, especially 1/1 to 3/1) while gas phase polymerizations are preferably conducted with comparatively high Al/Ti mole ratios (for example 20/1 to 150/1).

Solution processes for the polymerization and copolymerization of ethylene are well known in the art. These processes are conducted in the presence of an inert hydrocarbon solvent typically a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional slurry or solution process is from about 80 to about 300° C. (preferably from about 80 to about 120° C. for slurry polymerization and from about 120 to about 250° C. for solution polymerizations). However, as is illustrated in the Examples, the polymerization temperature for the solution process disclosed herein can be above 160° C. The upper temperature limit will be influenced by considerations which are well known to those skilled in the art, such as a desire to maximize operating temperature to reduce solution viscosity, while still maintaining good polymer properties. Increased polymerization temperatures generally reduce the molecular weight of the polymer. In other embodiments, the polymerization temperature can be between about 200 and about 300° C., or about 220 to about 250° C.

One example of a reaction process is a "medium pressure process," meaning that the pressure in the reactor is preferably less than about 6,000 psi (about 42,000 kiloPascals or kPa). Pressures can range from about 10,000 to about 40,000 kPa, or from about 2,000 to about 3,000 psi (about 14,000-about 22,000 kPa), or from 725 to about 3,000 psi (about 5,000-about 22,000 kPa).

Suitable monomers for copolymerization with ethylene include $C_{3-20}$ mono- and di-olefins. Example comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

Co- and ter-polymers of ethylene, and one or more copolymerizable monomers can also be prepared using the methods described herein. In one embodiment such polymers will contain about 50 to about 75 weight % ethylene, preferably about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In another embodiment the resulting polymer may comprise not less than about 80, or not less than about 90 weight % of ethylene and up to about 20, or less than 10 weight % of one or more copolymerizable monomers. In some embodiments the comonomers are $C_{3-8}$ alpha olefins such as 1-butene, 1-hexene and 1-octene.

The monomers are dissolved/dispersed in the solvent either prior to being fed to the reactor (or for gaseous monomers the monomer may be fed to the reactor so that it will dissolve in the reaction mixture). Prior to mixing, the solvent and monomers may be purified to remove potential catalyst poisons such as water, oxygen and other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

In some embodiments, the catalyst components may be premixed in the solvent for the reaction or fed as separate streams to the reactor. In some instances premixing it may be desirable to provide a reaction time for the catalyst components prior to entering the reaction.

One embodiment of the invention described herein provides a solution olefin polymerization process comprising i) preparing a procatalyst using the processes described herein above; ii) adding the procatalyst with a solvent selected from $C_{5-12}$ alkanes to one or more reactors in series or in parallel configuration together with ethylene and optionally one or more comonomers selected from $C_{3-8}$ comonomers, hydrogen to a reactor; and iii) adding an aluminum alkyl activator to the reactor in a molar ratio of about 1 to about 10 relative to the amount of procatalyst.

The polymerization processes may also use an aluminum alkyl activator selected from $R^4{}_y AlOR^5{}_{3-y}$, trialkyl aluminum compounds and MAO.

In some embodiments the solvent used in the polymerization processes is selected from hexane, cyclohexane, decane, heptane, isohexane, and dodecane. In other embodiments the solvent is isohexane. In other embodiments the solvent is decane.

In some embodiments a solution process is performed in a single continuous stirred tank reactor (CSTR) and optionally with one or more additional reactors. In other embodiments a solution process is performed in a dual reactor continuous reactor set up in series or parallel.

The process of this invention can also include the use of a tubular reactor that is connected to the discharge of the at least one CSTR. (For clarity, if two CSTR's are used in series, then the tubular reactor receives the discharge from the second CSTR).

The term "tubular reactor" is meant to convey its conventional meaning—namely a simple tube. The tubular reactor may have a length/diameter (L/D) ratio of at least 10/1. The tubular reactor is not agitated and is operated adiabatically. Thus, as polymerization progresses, the remaining comonomer is increasingly consumed and the temperature of the solution increases (both of which improve the efficiency of separating the remaining comonomer from the polymer solution). The temperature increase along the length of the tubular reactor may be greater than 3° C. (i.e. that the discharge temperature from the tubular reactor is at least 3° C. greater than the discharge temperature from the CSTR that feeds the tubular reactor).

The tubular reactor may have a feed port for additional ethylene and solvent. The feed is "tempered"—i.e. the temperature of the additional ethylene and/or solvent is heated to above ambient (or to about 100° C.) but the temperature is below the discharge temperature of the tubular reactor. In one embodiment, the ethylene is tempered to between about 80° C. to about 200° C. or between about 100° C. and about 200° C. In one embodiment the ethylene is added with solvent. The amount of solvent (expressed as a weight ratio, based on ethylene) is from about 20/1 to about 0.1/1, or from about 10/1 to about 1/1.

Optionally, the tubular reactor may also have feed ports for additional catalyst, cocatalyst, comonomer and/or telomerization agent (such as hydrogen). However, in some embodiments, no additional catalyst is added to the tubular reactor.

The total volume of the tubular reactor may be at least 10 volume % of the volume of the at least one CSTR, or from about 30% to about 200% (for clarity, if the volume of the CSTR is about 1000 liters, then the volume of the tubular reactor is at least about 100 liters, or from about 300 to about 2000 liters).

The total amount of ethylene added to the tubular reactor may be from 1 to 50 weight % of the total ethylene added to the CSTR(s). For example, if one CSTR is being operated with an ethylene flow rate of about 1000 kg/hr, then the ethylene flow to the tubular reactor would be from about 10 to about 500 kg/hr. Similarly, if two CSTR(s) were being operated with an ethylene flow of about 1000 kg/hr to the first and about 500 kg/hr to the second, then the flow of ethylene to the tubular reactor would be from about 15 to about 750 kg/hr.

In some embodiments the procatalyst is pre-formulated and added directly to the reactor.

In some embodiments the polymerization temperature is at least about 220° C., or at least about 230° C., or at least about 240° C.

In some embodiments the polymerization process using the procatalysts described herein results in a polymer having the same density but where the process uses at least about 10% less comonomer feed compared to a polymerization process using a procatalyst disclosed in U.S. Pat. No. 5,589,555.

In some embodiments the polymerization process using the procatalysts described herein results in a polymer having the same density but where the process uses at least about 10% less comonomer feed compared to a polymerization process using a procatalyst that does not comprise at least 0.2% of an EPR active species having a g value of 1.950.

In some embodiments the polymerization process using the procatalysts described herein results in a polymer having the same density but where the process uses at least about 10% less comonomer feed compared to a polymerization process using a procatalyst for polymerization that does not contain a tetrahedral $Ti^{3+}$ species, or that contains substantially no tetrahedral $Ti^{3+}$ species. Substantially no tetrahedral $Ti^{3+}$ species means that there is less than about 0.005%, or less than 0.01%, or less than 0.05% tetrahedral $Ti^{3+}$ species as determined by EPR and EPR simulations as described herein.

In other embodiments the polymerization process using the procatalysts described herein results in a polymer with the same density but with a higher Mw at any polymerization temperature than the Mw obtained for a polymer prepared using a procatalyst disclosed in U.S. Pat. No. 5,589,555.

In other embodiments the polymerization process using the procatalysts described herein results in a polymer with the same density but with a higher Mw at any polymerization temperature than the Mw obtained for a polymer prepared using a procatalyst that does not comprise at least 02% of an EPR active species having a g value of 1.950.

In other embodiments the polymerization process using the procatalysts described herein results in a polymer with the same density but with a higher Mw at any polymerization temperature than the Mw obtained for a polymer prepared using a procatalyst for polymerization that does not contain a tetrahedral $Ti^{3+}$ species, or that contains substantially no tetrahedral $Ti^{3+}$ species. Substantially no tetrahedral $Ti^{3+}$ species means that there is less than about 0.005%, or less than 0.01%, or less than 0.05% $Ti^{3+}$ species as determined by EPR and EPR simulations as described herein.

In some embodiments the reactor hold-up time is from about 30 seconds to about 1 hour. In other embodiments the reactor hold-up time is from about 30 seconds to about 30 minutes. In other embodiments the reactor hold-up time is from about 30 seconds to about 5 minutes. In other embodiments the reactor hold-up time is from about 1 minute to about 5 minutes.

Another embodiment of this invention provides a polyethylene polymer or copolymer having a density from about 0.910 g/cc to about 0.935 g/cc. Another embodiment of this invention provides a $CDBI_{50}$ octene greater than or equal to about 50. Another embodiment of this invention provides a polymer with a MWD from about 3 to about 8. Yet another embodiment of this invention provides substantially flat comonomer distribution within the final polymer product. Substantially flat comonomer distribution means that a plot of the branch content as a function of molecular weight as plotted on a GPC curve would give a line that is not more than about 15° off horizontal.

In some embodiments the polymer has less than about 10 ppm calculated residual titanium in the resulting polymer. In other embodiments the polymer has less than about 8 ppm calculated residual titanium in the resulting polymer. In other embodiments the polymer has less than about 3 ppm calculated residual titanium in the resulting polymer.

In some embodiments the polymer has less than about 120 ppm calculated residual halogen in the resulting polymer. In other embodiments the polymer has less than about 100 ppm calculated residual halogen in the resulting polymer. In other embodiments the polymer has less than about 60 ppm calculated residual halogen in the resulting polymer.

Another embodiment of this invention provides a polymer as described herein above for use in fabrication methods selected from extrusion, injection molding, thermoforming, and rotational molding.

Another embodiment of this invention provides a polymer as described herein above for use in plastic articles such as films, fibers, molded or thermoformed articles such as drums and agricultural spray tanks, and pipe coatings.

The present invention will further be described by reference to the following examples. The following examples are merely illustrative of the invention and are not intended to be limiting. Unless otherwise indicated, all percentages are by weight.

EXAMPLES

Chemicals and Reagents

Purchased cyclohexane was dried and deoxygenated by passing it through a bed of deoxygenation catalyst (brand name R311 from BASF), an alumina bed (brand name Selexsorb COS/CD), and a molecular sieve (3 A/13×) bed.

n-decane was purchased from Sigma Aldrich and the solvent was transferred into Nalgene bottles containing activated 13× molecular sieves and stored for a minimum of overnight before use.

Methyl pentane was purchased from Imperial Oil and it contained 100% of naphtha (petroleum), hydrotreated light. The solvent was dried by passing it through a bed containing Selexsorb CD and Selexsorb CDX.

Butylethyl Magnesium (BEM), 20 wt. % in heptane solution, was purchased from Albemarle. It was contained in a pyrosafe cylinder and stored in a glovebox.

Isobutylaluminumdichloride (IBADC), 97 wt. %, was purchased from Albemarle. It was contained in a pyrosafe cylinder and stored in a glovebox. IBADC has a boiling point of 242° C. and a density of 1.12 g/mL.

Diethylaluminum Ethoxide (DEAO), 25 wt. % in heptane solution, was purchased from AkzoNobel. DEAO has a boiling point of 98° C. and a density of 0.684 g/mL.

Ethylaluminumdichloride (EADC), 20 wt. % in heptane, was purchased from AkzoNobel. EADC has a boiling point of 115° C. and a density of 1.20 g/mL.

Diethylaluminumchloride (DEAC), 97 wt. %, was purchased from Sigma Aldrich. DEAC has a boiling point of 125° C. and a density of 0.961 g/mL.

Isobutylaluminoxane (IBAO), 2.7 wt. % in heptane was purchased from Albemarle. It was contained in a glass bottle and stored in a glovebox freezer. IBAO has a boiling point of 98° C. and a density of 0.691 g/mL.

Tri-isobutylaluminum (TIBAL) was purchased from AkzoNobel. TIBAL has a boiling point of 86° C. and a density of 0.786 g/mL.

A drying reagent (Drierite™) was purchased from Sigma Aldrich. The drying reagent was conditioned before use by baking it in a muffle furnace set to 260° C. for a period of 16 hours. The drying reagent contained no indicator.

2-chloro-2-methylpropane (tert-butyl chloride or tBuCl) was purchased from Sigma Aldrich. The tBuCl was dried by placing it over the pre-dried drying reagent under an inert environment for approximately 16 hours at a ratio of 30 g of drying reagent per 100 mL of tBuCl. The flask containing the tBuCl was covered in foil to shield it from light during this process to minimize the formation of isobutylene. The dried tBuCl was further purified by vacuum transfer. The tBuCl moisture content was 12 ppm or less and had purity above 97% after purification. All glassware used in this procedure was dried in a 130° C. oven overnight.

Ethylene was purchased from Praxair as polymer grade. The ethylene was purified and dried by passing the gas through a series of purification beds including alumina (brand: Selexsorb COS), molecular sieve (type: 13×), and a deoxygenation bed (brand: Oxiclear®).

Purchased 1-octene was dried by storing a 1-liter batch over 3 A molecular sieves.

Titanium (IV) chloride ($TiCl_4$) was purchased from Sigma Aldrich as 99.9% purity packaged under nitrogen.

Methanol was purchased as GR ACS grade from EMD Chemicals.

Analytical Methods

Melt index ("MI") measurements are conducted according to ASTM method D-1238.

Polymer densities are measured using ASTM D-1928.

Polymer molecular weights and molecular weight distributions were measured by gel permeation chromatography (GPC). The instrument (Waters 150-C) was used at 140° C. in 1,2,4-trichlorobenzene and was calibrated using polyethylene standards.

Polymer branch frequencies were determined by FT-IR. The instrument used was a Nicolet 750 Magna-IR spectrophotometer.

Some catalyst samples were analyzed for titanium valence distribution. A redox titration method for titanium valence distribution was developed based on a scientific paper (J. C. W. Chien et. al, *J. Polym. Sci. Part A: Polym. Chem.* 1989, 27, 1499-1514) and an ultraviolet (UV) method for titanium content analysis was developed based on ASTM standard E878-01.

Inductively Coupled Plasma-Mass Spectrometry (ICP-MS) analysis was done on an Agilent 7700 series instrument. The samples were digested using a 5% nitric acid solution and analyzed in High Energy Helium mode to remove any spectral interferences. The instrument was calibrated using the certified standards. Ti and Mg standards were purchased from SPC Sciences and Cl was purchased from BDH.

X-ray diffraction patterns were collected using a Bruker General Area Detector Diffraction System (GADDS). X-rays were generated using a Cu tube (wavelength of 1.54184 A) set at 30 kV and 30 mA. The sample to detector distance was 5.0 cm. The angle of the detector to the sample (2theta) was 30°. For data collection, the powdered samples were placed in 1.0 mm ID quartz tubes. The diffraction patterns were background corrected.

GPC-FT-IR: Polymer sample solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 mL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in the published work by P. J. DesLauriers *Polymer* 2002, 43, 159-170.

TREF: A polymer sample (80 to 100 mg) was introduced into the reactor vessel of the Polymer ChAR crystal-TREF unit. The reactor vessel was filled with 35 ml 1,2,4-trichlorobenzene (TCB), heated to the desired dissolution temperature (e.g. 150° C.) for 2 hours. The solution (1.5 mL) was then loaded into the TREF column filled with stainless steel beads. After allowed to equilibrate at a given stabilization temperature (e.g. 110° C.) for 45 minutes, the polymer solution was allowed to crystallize with a temperature drop from the stabilization temperature to 30° C. (0.09° C./minute). After equilibrating at 30° C. for 30 minutes, the crystallized sample was eluted with TCB (0.75 mL/minute) with a temperature ramp from 30° C. to the stabilization temperature (0.25° C./minute). The TREF column was cleaned at the end of the run for 30 minutes at the dissolution temperature. The data were processed using Polymer ChAR software, Excel spreadsheet and TREF software developed in-house.

CDBI is defined to be the percent of polymer whose composition is within 50% of the median comonomer composition. It is calculated from the composition distribution curve and the normalized cumulative integral of the composition distribution curve, as illustrated in U.S. Pat. No. 5,376,439.

EPR is a magnetic resonance technique capable of detecting unpaired electrons in chemical samples. This occurs through observation of the magnetic field at which the unpaired electron resonates when irradiated with monochromatic radiation, typically in the microwave frequency range. The exact value of the resonant field is sensitive to the chemical environment of the electron and is specified by a g value.

The g values were calculated using the following formula (Atkins, Peter W., *Physical Chemistry, 5th Ed.,* 1994, Freeman Press, New York):

$$g = \frac{h\nu}{\mu_B B}$$

Where h is Planck's constant ($6.63\times10^{-34}$ J·s), ν is the frequency of the microwaves (in Hz), $\mu_B$ is the Bohr magneton ($9.27\times10^{-24}$ J·T$^{-1}$) and B is the magnetic field (in T).

All EPR spectra were recorded on a Bruker EMX 10/12 spectrometer at room temperature. Field calibration was done using the strong pitch standard. The Ziegler Natta catalysts were dried and packed into 4 mm quartz EPR tubes and sealed with epoxy to maintain an inert atmosphere in the tube.

EPR simulations were performed using the Matlab based package EasySpin.

The principle of the simulation is described in the paper (Stefan Stoll, Arthur Schweiger, "EasySpin, a comprehensive software package for spectral simulation and analysis in EPR", *J. Magn. Reson.* 2006, 178, 42-55.

Catalyst Synthesis and Characterization

All experiments were conducted in a glovebox under a nitrogen atmosphere using an oil bath or heating mantle as a source of heat. All glassware used was cleaned in a base bath overnight, rinsed in an acid bath, rinsed with deionized water, then placed in a 135° C. oven overnight to dry.

Example 1

MgCl$_2$ Synthesis (δ-MgCl$_2$) and Characterization 16.910 g (31.377 mmol) of 20.5 wt. % BEM was added to 295 mL decane in a 1000 mL round bottom flask. The solution was then heated to an internal temperature of 45° C. (monitored using a thermowire) while being stirred using an overhead stirrer at 350 rpm. 7.149 g (77.228 mmol) of cold tBuCl diluted in 5 mL of decane was added via syringe to the BEM solution in one shot. The solution was allowed to stir for 30 minutes at 50° C. After the formation of MgCl$_2$ slurry, the entire mixture was transferred into a 500 ml pyrex. Cl/Mg was 2.33 (mol/mol) based on ICP results. See FIG. 2 for GADDS result.

Example 2

Synthesis of Catalyst 1

16.909 g (30.304 mmol) of 19.8 wt. % BEM was added to 295 mL decane in a 1000 mL round bottom flask. The solution was then heated to an internal temperature of 45° C. (monitored using a thermowire) while being stirred using an overhead stirrer at 350 rpm. 7.072 g (76.396 mmol) of cold tBuCl diluted in 5 mL of decane was added via syringe to the BEM solution in one shot. The solution was allowed to stir for 30 minutes at 50° C. After the formation of $MgCl_2$, 0.758 g (3.996 mmol) of $TiCl_4$ was added to the $MgCl_2$ at 50° C. using a syringe. Following the addition of the $TiCl_4$, 6.229 g (40.1871 mmol) of IBADC diluted in 20 mL of decane was added to the reaction via dropping funnel at a rate of ~3 drops/second. After rinsing the funnel once the addition was complete, the slurry was slowly heated to an internal temperature of 85° C. and allowed to stir for 1 h. The catalyst was then filtered through a frit, washing once with 20 mL decane and 4 times with 20 mL cyclohexane and then transferred into a 100 mL glass Pyrex bottle and reslurried in 80 mL of cyclohexane.

EPR Spectrum from Catalyst 1 and Spectral Deconvolution by Simulation

Experimental conditions: frequency=9.389 GHz, microwave power=12.7 mW, time constant=0.64 ms, modulation amplitude=1 G, average of 8 scans of 42 s. Simulation parameters: A) g=[1.897, 1.907, 1.944], line widths=[90, 170, 60] Gauss; B) $g_\perp$=1.880, $g_\parallel$=1.945, line width ($\perp$)=290 Gauss, line width ($\parallel$)=330 Gauss; C) g=1.950, line width=50 Gauss; contributions to signal intensity: A=18.6%, B=80.7%, C=0.7%. See FIG. 4 for the EPR spectrum and simulation.

Example 3

Synthesis of Catalyst 2a 16.665 g (30 mmol) of 19.9 wt. % BEM was added to 295 mL decane in a 1000 mL round bottom flask. The solution was then heated to an internal temperature of 45° C. (monitored using a thermowire) while being stirred using an overhead stirrer at 350 rpm. 6.942 g of cold tBuCl diluted in 5 mL of decane was added via syringe to the BEM solution in one shot. The solution was allowed to stir for 30 minutes at 50° C. After the formation of $MgCl_2$, 1.059 g (6.8 mmol) of diethyl aluminum chloride (IBADC) diluted in 5 mL of decane was added to the $MgCl_2$ at 50° C. using a funnel in one shot and the solution was allowed to stir for 10 minutes. 0.758 g (4.0 mmol) of $TiCl_4$ diluted with 5 mL of decane was added to the $MgCl_2$ at 50° C. using a syringe all in one shot. Following the addition of the $TiCl_4$, 3.430 g (6.6 mmol) of 25 wt. % diethylaluminum ethoxide diluted in 5 mL of decane was added to the reaction via pipet. The slurry was heated to an internal temperature of 85° C. and the solution was allowed to stir for 1 h once it reached temperature. The catalyst was then filtered through a frit washing once with 20 mL decane and 4 times with 20 mL cyclohexane and then transferred into a glass bottle for storage and reslurried in 80 mL of cyclohexane.

Example 4

Synthesis of Catalyst 2b 107.792 g (200 mmol) of 20.5 wt. % BEM was added to approx. 520 mL cold decane from the freezer to a 3000 mL round bottom flask. The solution was then allowed to heat up to an internal temperature of 20° C. (monitored using a thermowire) while being stirred using an overhead stirrer at 470 rpm. 42.579 g (460 mmol) of tBuCl diluted in 70 mL of decane was added via a dropping funnel to the BEM solution in one shot. After rinsing the funnel once the addition was complete, the solution was allowed to stir for 35 minutes while the solution was heated to 50° C.

After the formation of the $MgCl_2$, 7.029 g (45.3 mmol) of IBADC diluted in 30 mL of decane was added to the $MgCl_2$ at 50° C. using a dropping funnel in one shot. After rinsing the funnel once the addition was complete, the solution was allowed to stir for 10 minutes. Following the addition of the IBADC, 5.057 g (26.7 mmol) of $TiCl_4$ diluted in 30 mL of decane was added to the reaction via dropping funnel in one shot. After rinsing the funnel once the addition was complete, the slurry was allowed to stir for 5 minutes. 22.904 g (44 mmol) of DEAO diluted in 60 mL of decane was added to the reaction via dropping funnel in one shot. After rinsing the funnel once the addition was complete, the solution was slowly heated to an internal temperature of 85° C. and allowed to stir for 1 h. The heating was turned off and the solution was allowed to cool for 30 minutes. The catalyst was then filtered through a frit washing once with 130 mL decane and 2 times with 130 mL cyclohexane. The solid catalyst was transferred into a glass bottle for storage and re-slurried with approximately 350 mL of cyclohexane.

EPR spectrum from catalyst 2b and spectral deconvolution by simulation. Experimental conditions: frequency=9.391 GHz, microwave power=12.7 mW, time constant=0.64 ms, modulation amplitude=1 G, average of 8 scans of 42 s. Simulation parameters: A) g=[1.899, 1.899, 1.949], line widths=[120, 120, 120] Gauss; B) $g_\perp$=1.887, $g_\parallel$=1.945, line width ($\perp$)=340 Gauss, line width ($\parallel$)=460 Gauss; C) g=1.950, line width=42 Gauss; contributions to signal intensity: A=22.3%, B=77.5%, C=0.2%. See FIG. 5 for the EPR spectrum and simulation.

Example 5

Synthesis of Catalyst 2c

The catalyst was made with the procedure of Catalyst 2b but with multiple batches combined.

Example 6

Synthesis of Catalyst 3

16.167 g (30 mmol) of 20.5 wt % BEM was added to approx. 285 mL decane in a 1000 mL round bottom flask. The solution was then allowed to heat up to an internal temperature of 45° C. (monitored using a thermowire) while being stirred using an overhead stirrer at 345 rpm. 6.387 g (69 mmol) of tBuCl diluted in 5 mL of decane was added via a dropping funnel to the BEM solution in one shot. After rinsing the funnel once the addition was complete, the solution was allowed to stir for 30 minutes while the slurry was heated to 50° C.

After the formation of $MgCl_2$, 4.231 g (6.8 mmol) of 20.4 wt. % $EtAlCl_2$ diluted in 5 mL of decane was added to the $MgCl_2$ at 50° C. using a dropping funnel in one shot. After rinsing the funnel once the addition was complete, the solution was allowed to stir for 10 minutes. Following the addition of the $EtAlCl_2$, 0.761 g (4.0 mmol) of $TiCl_4$ diluted in 5 mL of decane was added to the reaction via dropping funnel in one shot. After rinsing the funnel once the addition was complete, the slurry was allowed to stir for 5 minutes. 3.434 g (6.6 mmol) of DEAO diluted in 10 mL of decane was added to the reaction via dropping funnel in one shot. After rinsing the funnel once the addition was complete, the solution was slowly heated to an internal temperature of 85°

C. and allowed to stir for 1 h. The heating was turned off and the solution was allowed to cool for 30 minutes. The catalyst was then filtered through a frit washing once with 20 mL decane and 2 times with 20 mL cyclohexane. The solid catalyst was transferred into a glass bottle for storage and re-slurried with approx. 80 mL of cyclohexane. The catalyst was analyzed for wt % Ti by ICP and determined to be 4.06.

Example 7

Synthesis of Catalyst 4

16.167 g (30 mmol) of 20.5 wt % BEM was added to approx. 285 mL decane in a 1000 mL round bottom flask. The solution was then allowed to heat up to an internal temperature of 45° C. (monitored using a thermowire) while being stirred using an overhead stirrer at 350 rpm. 6.387 g (69 mmol) of tBuCl diluted in 5 mL of decane was added via a dropping funnel to the BEM solution in one shot. After rinsing the funnel once the addition was complete, the slurry was allowed to stir for 30 minutes while the slurry was heated to 50° C.

After the formation of $MgCl_2$, 0.825 g (6.8 mmol) of diethyl aluminum chloride (DEAC) diluted in 5 mL of decane was added to the $MgCl_2$ at 50° C. using a dropping funnel in one shot. After rinsing the funnel once the addition was complete, the slurry was allowed to stir for 10 minutes. Following the addition of the DEAC, 0.755 g (4.0 mmol) of $TiCl_4$ diluted in 5 mL of decane was added to the reaction via dropping funnel in one shot. After rinsing the funnel once the addition was complete, 1.215 g (2.33 mmol) of 25 wt % DEAO diluted with 5 mL decane was added all at once through a funnel and the slurry was heated to an internal temperature of 85° C. and the solution was allowed to stir for 1 h. The heating was turned off and the solution was allowed to cool for 30 minutes. The catalyst was then filtered through a frit washing once with 50 mL decane and 2 times with 20 mL cyclohexane. The solid catalyst was transferred into a glass bottle for storage and re-slurried with approx. 80 mL of cyclohexane. The catalyst was analyzed for wt % Ti by ICP and determined to be 3.905.

Example 8

Synthesis of Catalyst 5

16.167 g (30 mmol) of 20.5 wt. % BEM was added to approx. 285 mL decane to a 1000 mL round bottom flask. The solution was then allowed to heat up to an internal temperature of 45° C. (monitored using a thermowire) while being stirred using an overhead stirrer at 350 rpm. 6.395 g (69 mmol) of tBuCl diluted in 5 mL of decane was added via a dropping funnel to the BEM solution in one shot. After rinsing the funnel once the addition was complete, the slurry was allowed to stir for 30 minutes while the slurry was heated to 50° C.

After the formation of $MgCl_2$, 1.052 g (6.8 mmol) of IBADC diluted in 5 mL of decane was added to the $MgCl_2$ at 50° C. using a dropping funnel in one shot. After rinsing the funnel once the addition was complete, the slurry was allowed to stir for 10 minutes. Following the addition of the IBADC, 0.761 g (4.0 mmol) of $TiCl_4$ diluted in 5 mL of decane was added to the reaction via dropping funnel in one shot. After rinsing the funnel once the addition was complete, the slurry was heated to an internal temperature of 85° C. 10.054 g (2.10 mmol) of 2.7 wt % IBAO diluted with decane was added dropwise slowly over approximately 20 minutes. Then the solution was allowed to stir for 1 h. The heating was turned off and the slurry was allowed to cool for 30 minutes. The catalyst was then filtered through a frit washing once with 20 mL decane and 2 times with 20 mL cyclohexane. The solid catalyst was transferred into a glass bottle for storage and re-slurried with approx. 80 mL of cyclohexane. The catalyst was analyzed for wt % Ti by ICP and determined to be 3.33.

Example 9

Synthesis of Catalyst 6

16.172 g (30 mmol) of 20.5 wt. % BEM was added to approx. 285 mL decane to a 1000 mL round bottom flask. The solution was then allowed to heat up to an internal temperature of 45° C. (monitored using a thermowire) while being stirred using an overhead stirrer at 350 rpm. 6.389 g (69 mmol) of tBuCl diluted in 5 mL of decane was added via a dropping funnel to the BEM solution in one shot. After rinsing the funnel once the addition was complete, the slurry was allowed to stir for 30 minutes while the slurry was heated to 50° C.

After the formation of $MgCl_2$, 1.060 g (6.8 mmol) of IBADC diluted in 5 mL of decane was added to the $MgCl_2$ at 50° C. using a dropping funnel in one shot. After rinsing the funnel once the addition was complete, the slurry was allowed to stir for 10 minutes. Following the addition of the IBADC, 0.760 g (4.0 mmol) of $TiCl_4$ diluted in 5 mL of decane was added to the reaction via dropping funnel in one shot. After rinsing the funnel once the addition was complete, the slurry was heated to an internal temperature of 85° C. 3.189 g (4.10 mmol) of 25.7 wt % TIBAL diluted with decane was added dropwise slowly over approximately 60 minutes. Then the solution was allowed to stir for 1 h. The heating was turned off and the solution was allowed to cool for 30 minutes. The catalyst was then filtered through a frit washing once with 20 mL decane and 2 times with 20 mL cyclohexane. The solid catalyst was transferred into a glass bottle for storage and re-slurried with approx. 80 mL of cyclohexane.

Comparative Example 1

Synthesis of Catalyst 7

16.665 g (30 mmol) of 19.9 wt. % BEM was added to approx. 285 mL decane in a 1000 mL round bottom flask. The solution was then heated to an internal temperature of 45° C. (monitored using a thermowire) while being stirred using an overhead stirrer at 350 rpm. 6.942 g (75 mmol) of cold tBuCl diluted in 5 mL of decane was added via syringe to the BEM solution in one shot. The slurry was allowed to stir for 30 minutes while the slurry was heated to 50° C.

After the formation of $MgCl_2$, 0.758 g of $TiCl_4$ diluted in 5 mL of decane was added to the $MgCl_2$ at 50° C. using a syringe all in one shot. Following the addition of the $TiCl_4$, 5.880 g (11.3 mmol) of 25 wt. % diethylaluminum ethoxide diluted in 5 mL of decane was added to the reaction via pipet (1-2 mL at a time) while heating up the slurry to 85° C. Slurry was allowed to stir for 15 minutes between each addition and the temperature was slowly increased to 85° C. (i.e. add at 50, 60, 70° C. until color no longer changes). Addition was stopped when the color no longer changed. Slurry was stirred for 1 hour once it reached temperature. The catalyst was then filtered through a frit washing once with 20 mL decane and 4 times with 20 mL cyclohexane. The solid catalysts was then transferred into a glass bottle for storage and re-slurried with approx. 80 mL of cyclohexane.

Comparative Example 2

Synthesis of Catalyst 8

The catalyst was made exactly as the catalyst 2 with mother liquor removal, but without washing steps.

Comparative Example A

Based on Disclosure in U.S. Pat. No. 7,666,810 B2

Within the glovebox, 16.665 g (30 mmol) of 19.9 wt. % BEM was added to 100 mL cyclohexane in a 1000 mL round bottom flask. The solution was then further diluted with an additional 190 mL cyclohexane and placed in an oil bath. The flask was equipped with a condenser containing a thermocouple wire, a paddle stirrer, and a septum. Using an overhead stirrer, the solution was stirred at 400 rpm and heated to 45° C. In one shot, 5.95 mL (54 mmol) of tBuCl diluted in approximately 5 mL cyclohexane was added via gas tight syringe. The solution was stirred for half an hour at 50° C. The catalyst slurry was filtered and washed three times with cyclohexane (20 mL each). 1.79 mL of a 2.24 M TiCl$_4$ solution was added the AST MgCl$_2$ at 50° C. with a ratio of Mg:Ti=7.5 using a syringe. The solution was stirred for a half hour, then filtered and washed three times with cyclohexane (20 mL each). The catalyst was re-slurried in 70 mL of cyclohexane and transferred into a glass bottle for storage. A small amount of the catalyst slurry was dried and the solid sample was prepared for EPR analysis
EPR Spectrum from Preparation Comparative Example A and Spectral Deconvolution by Simulation.

Experimental conditions: frequency=9.395 GHz, microwave power=12.7 mW, time constant=0.64 ms, modulation amplitude=1 G, average of 8 scans of 42 s. Simulation parameters: A) g=[1.910, 1.898, 1.955], line widths=[175, 115, 75] Gauss; B) g$_\perp$=1.883, g$_\parallel$=1.972, line width ($\perp$)=235 Gauss, line width ($\parallel$)=200 Gauss; C) g=1.969, line width=37 Gauss; contributions to signal intensity: A=52.4%, B=47.3%, C=0.3%. See FIG. 6 for the EPR spectrum and simulation.

TABLE 1 catalyst properties

| Catalyst # | Chemistry | Ti wt % | Ti(III)/Ti total | Catalyst appearance |
|---|---|---|---|---|
| Catalyst 1 | IBADC reduction | | 83 | deep purple |
| Catalyst 2a | IBADC/DEAO | | 84 | deep purple |
| Catalyst 2b | IBADC/DEAO | 4.9 | | reddish-brown |
| Catalyst 2c | IBADC/DEAO | 4.4 | | deep purple |
| Catalyst 3 | EADC/DEAO | 4.1 | | purple |
| Catalyst 4 | DEAC/DEAO | 3.9 | | purple |
| Catalyst 5 | IBADC/IBAO | 3.3 | | orange brown |
| Catalyst 6 | IBADC/TIBAL | 3.6 | | reddish-brown |
| Catalyst 7 | DEAO | | 74 | dark caramel brown |
| Catalyst 8 | IBADC/DEAO No washing | | 74 | reddish-brown |

Testing of the Offline Catalyst in a Laboratory Scale Continuous Polymerization Unit Continuous polymerizations were conducted on a continuous polymerization unit (CPU). The CPU contained a 71.5 mL stirred reactor and was operated between 160 to 280° C. for the polymerization experiments. An upstream mixing reactor having a 20 mL volume was operated at 5° C. lower than the polymerization reactor. The mixing reactor was used to pre-heat the ethylene, octene and some of the solvent streams. Catalyst feeds and the rest of the solvent were added directly to the polymerization reactor as a continuous process. A total continuous flow of 27 mL/min into the polymerization reactor was maintained.

The catalysts from the examples above were added to the CPU in a slurry delivering system. The slurry delivery system consisted of an inverted 1000 mL syringe pump with a 3500 mL stirred slurry reservoir. Slurry was transferred from a stirred bottle, via pressure differential, through a stainless steel cannula into the 3500 mL stirred slurry reservoir. The slurry was then diluted in the reservoir to the required concentration with purified cyclohexane. Once the slurry was transferred and diluted, it was stirred in the reservoir for a minimum of 15 minutes before any was transferred into the syringe pump. When the slurry was ready to be transferred to the reactor, an air actuated solenoid valve, which isolated the reservoir from the syringe barrel, was opened allowing slurry flow to the syringe barrel. The syringe barrel was then loaded to the desired volume at a flow of 25 mL/min, with constant stirring in the syringe barrel. When the syringe barrel was filled to the required volume, the solenoid valve to the reservoir was closed, isolating the syringe barrel from the reservoir. The syringe barrel was then brought up to the reactor pressure while still isolated from the reactor. When the syringe barrel has reached the reactor pressure, an air actuated solenoid valve (which isolated the syringe barrel from the reactor) was opened. The syringe pump was then calibrated and programmed to deliver the desired flow rate of slurry.

For the slurry catalyst experiments, copolymers were made at an octene/ethylene weight ratio of 0.5. The ethylene was fed at a 10 wt. % ethylene concentration in the polymerization reactor. The CPU system operated at a pressure of 10.5 MPa. The solvent, monomer, and comonomer streams were all purified by the CPU systems before entering the reactor. Q is ethylene conversion (as determined by an online gas chromatograph (GC)) and polymerization activity Kp is defined as:

$$(Kp)(HUT)=Q((1-Q)(1/\text{catalyst concentration})$$

wherein Q is the fraction of ethylene monomer converted; HUT is a reciprocal space velocity (hold up time) in the polymerization reactor expressed in minutes and maintained constant throughout the experimental program; and the catalyst concentration is the concentration in the polymerization reactor expressed in mmol of Ti per liter and Ti concentration of the slurry catalyst was determined by ICP.

All polymerization experiments were conducted at 220° C. and polymers were collected at 90±1 ethylene conversion and diethyl aluminum ethoxide (DEAO) to Ti molar ratio between 2 to 4.

TABLE 2

Catalyst performance on CPU

| Run # | Catalyst code | CJ/Ti ratio | Ethylene conversion Q | Kp (1/mM* min) | Mw (10$^{-3}$) | PD | Br/1000 C |
|---|---|---|---|---|---|---|---|
| 1 | Catalyst 1 | 3.6 | 90.2 | 59.0 | 66.1 | 2.7 | 10.2 |
| 2 | Catalyst 2a | 2.0 | 89.7 | 89.8 | 57.4 | 3.0 | 12.4 |
| 3 | Catalyst 2b | 3.3 | 90.5 | 62.5 | 73.6 | 3.5 | 10.5 |
| 4 | Catalyst 2c | 2.2 | 89.7 | 71.7 | 68.7 | 3.0 | 11.1 |
| 5 | Catalyst 3 | 2.2 | 90.6 | 69.3 | 70.1 | 3.1 | 10.9 |
| 6 | Catalyst 4 | 2.1 | 90.6 | 74.9 | 66.6 | 2.6 | 10.0 |
| 7 | Catalyst 5 | 2.3 | 90.0 | 68.9 | 67.9 | 2.9 | 10.9 |

TABLE 2-continued

Catalyst performance on CPU

| Run # | Catalyst code | CJ/Ti ratio | Ethylene conversion Q | Kp (1/mM*min) | Mw ($10^{-3}$) | PD | Br/1000 C |
|---|---|---|---|---|---|---|---|
| 8 | Catalyst 6 | 2.0 | 89.6 | 68.8 | 78.4 | 2.7 | 10.7 |
| 9 | Catalyst 7 | 1.5 | 90.4 | 57.1 | 65.1 | 3.3 | 9.7 |
| 10 | Catalyst 8 | 2.1 | 89.9 | 72.9 | 61.8 | 3.1 | 11.7 |

Testing of the inventive offline Ziegler Natta (Z/N) slurry catalyst (Catalyst 2c) at the pilot plant scale continuous polymerization facility and Catalyst 9 made through an inline formed ZN catalyst as comparative example 3.

The examples in Table 3 illustrate the continuous flow, solution copolymerization of ethylene and 1-octene at a medium pressure using a single pilot plant reactor system and an offline slurry catalyst (Catalyst 2c). The first reactor was a continuous stirred tank reactor (CSTR) with a volume of 24.0 liters. The second reactor was a tubular reactor having a volume of 10% of the CSTR volume (2.4 liters). Monomers, solvent and catalyst were fed into the CSTR as indicated in Table 3 (Operation mode 1). An offline Ziegler Natta slurry catalyst (Catalyst 2c) with an activator consisting of diethyl aluminum ethoxide (DEAO) or triisobutyl-aluminium (TIBAL) were used in the experiments. For comparison of inventive catalyst 2c, a comparative inline formed Ziegler Natta (Z/N) catalyst system (Catalyst 9) was used and described in the next section.

Catalyst 2c was pumped into the continuous flow polymerization reactor using the slurry delivering system. The slurry delivery system consisted of a slurry cylinder, agitated slurry day tank, recirculation loop, slurry catalyst metering pump and solvent diluent loop. The diluted slurry catalyst was transferred from the slurry cylinder to the slurry day tank in several charges by pressurizing/sparging the cylinder with nitrogen. Once the slurry catalyst was transferred into the slurry catalyst day tank, the agitator and recirculation pump were started to keep the catalyst slurry in suspension and constant composition. The temperature of the diluted slurry catalyst was maintained at ambient temperature. Tank pressure was maintained at 300 kPag. When the slurry catalyst was ready to be transferred to the reactor, the slurry catalyst delivery pump was started and slurry catalyst was lined up to the pump. At the discharge of the slurry catalyst delivery pump, a high flow solvent diluent was used to keep the slurry catalyst in suspension and aid in delivery of the catalyst to the reactor. The diluent flowrate was maintained at 15 kg/hr. The temperature of the solvent was controlled at 25° C. The solvent and slurry catalyst were pumped into a flow transmitter and the flow was recorded. The slurry catalyst flowrate into the reactor was calculated by the difference between the diluent flowrate and combined diluent and slurry catalyst flowrate. Slurry catalyst flows (and ppms) into the reactor are adjusted by changing the slurry catalyst delivery pump motor variable frequency drive or pump stroker. The catalyst flowrate had an aim setpoint expressed as parts per million Ti by weight, as shown in the table and was adjusted to maintain total ethylene conversions above 80%.

The inline formed Ziegler Natta catalyst system (Catalyst 9) as mentioned above consisting of titanium tetrachloride ($TiCl_4$), butyl ethyl magnesium (BEM) and tertiary butyl chloride (tBuCl), with an activator consisting of triethyl aluminum (TEAL) or diethyl aluminum ethoxide (DEAO) was used. The BEM and TEAL were provided "premixed" (20/1 Mg/Al mole ratio). All catalyst components were mixed in the methyl pentane solvent within the Catalyst Torpedo. The mixing order was BEM/TEAL and tBuCl (Section #1); followed by $TiCl_4$ (Section #2); then followed by DEAO (Section #3). The catalyst was pumped into the reactor together with the methyl pentane solvent. The catalyst flowrate had an aim set point expressed as parts per million Ti by weight and was adjusted to maintain total ethylene conversions above 80%. Thus, in Table 3, Product 1, product produced in this reactor configuration establishes a "baseline" reactor operating conditions for a given melt index, density and stress exponent. Product 2 was made with Catalyst 2c with the same aluminum activator. The reactor operating conditions were adjusted to yield similar melt index, density and stress exponent as in Product 3 was produced using triisobutylaluminium (TIBAL) as the activator.

The examples in Table 4 illustrate the continuous flow, solution copolymerization of ethylene and 1-octene at a medium pressure using a single pilot plant reactor system and an offline slurry catalyst (Catalyst 2c). The first reactor was a continuous stirred tank reactor (CSTR) with a volume of 24.0 liters. The second reactor was a tubular reactor having a volume of 82% of the CSTR volume (19.7 liters). Catalysts were fed into the CSTR. Monomer and solvent were split between the two reactors as indicated in Table 4 (Operation mode 2). For comparison, the inline formed Ziegler Natta catalyst system (Catalyst 9) was used. Thus, in Table 4, Product 4, the product produced in this reactor configuration establishes a "baseline" reactor operating conditions for a given melt index, density and stress exponent. Product 5 was made with the offline slurry catalyst (Catalyst 2c) with the same activator. The reactor operating conditions were adjusted to yield similar melt index, density and stress exponent as in Product 4. Product 6 was produced using triisobutylaluminium (TIBAL) as the activator.

A list of other abbreviations used in the Tables follows:
hr: hour
conc: concentration
wt %: weight percent
wt/wt: weight/weight
Temp: temperature
C: degrees Celsius
rpm: revolutions per minute
mol: mole or molar
ppm: parts per million by weight

TABLE 3

Catalyst 2c and catalyst 9 performance under operation mode 1

| | Units | Product 1 Catalyst 9 Comparative example 3 Values | Product 2 Catalyst 2c Values | Product 3 Catalyst 2c Values |
|---|---|---|---|---|
| Overall | | | | |
| Total flow to CSTR and tubular reactor | kg/hr | 610.0 | 610.0 | 559.9 |

TABLE 3-continued

Catalyst 2c and catalyst 9 performance under operation mode 1

|  | Units | Product 1 Catalyst 9 Comparative example 3 Values | Product 2 Catalyst 2c Values | Product 3 Catalyst 2c Values |
|---|---|---|---|---|
| Overall ethylene conversion | % | 92.2 | 92.3 | 92.0 |
| Overall Polymer Production Rate (based on heat/mass balance) | kg/hr | 76.8 | 82.6 | 73.0 |
| Overall Polymer conc | % | 12.5 | 13.5 | 13.0 |
| CSTR conditions | | | | |
| Total flow to CSTR | kg/hr | 600.0 | 600.0 | 549.9 |
| Ethylene feed conc. to CSTR | wt % | 12.7 | 13.7 | 13.2 |
| 1-octene/ethylene ratio in CSTR feed | wt/wt | 0.48 | 0.46 | 0.48 |
| hydrogen conc in CSTR feed | ppm | 1.00 | 1.00 | 1.00 |
| Primary Feed Temp to CSTR | C. | 30.0 | 30.0 | 30.0 |
| CSTR Mean Temp | C. | 188.8 | 199.5 | 194.9 |
| Ethylene conversion at CSTR outlet | % | 90.1 | 90.0 | 90.0 |
| CSTR Agitator Speed | rpm | 900.0 | 900.0 | 900.0 |
| CSTR Polymer production rate (based on heat/mass balance) | kg/hr | 75.1 | 80.5 | 71.4 |
| Tubular Reactor conditions | | | | |
| Tubular reactor volume | % CSTR | 10.0 | 10.0 | 10.0 |
| Total flow to tubular reactor | kg/hr | 10.0 | 10.0 | 10.0 |
| Tubular reactor feed temperature | C. | 130.9 | 130.2 | 129.8 |
| Tubular reactor Outlet Temperature | C. | 192.2 | 203.4 | 198.3 |
| Ethylene conversion at tubular reactor outlet | % | 21.2 | 22.7 | 20.3 |
| Tubular reactor polymer production rate (based on heat/mass balance) | kg/hr | 1.7 | 2.1 | 1.6 |
| Catalyst Ratios and conditions | | | | |
| Catalyst concentration in CSTR | ppm Ti | 1.26 | 0.87 | 0.77 |
| Cl/Mg ratio | mol/mol | 2.01 | N/A | N/A |
| Al/Ti ratio | mol/mol | 1.35 | 1.55 | 2.18 |
| $Et_3Al$/Ti ratio | mol/mol | 0.35 | N/A | N/A |
| Catalyst Productivity | wt/wt | 5,895 | 6,978 | 7,602 |
| Co-Catalyst Productivity | wt/wt | 133,261 | 181,172 | 140,322 |
| Catalyst Torpedo Data | | | | |
| Section #1 hold-up time | sec | 31.4 | N/A | N/A |
| Section #1 temperature | C. | 65.5 | N/A | N/A |
| Section #2 hold-up time | sec | 14.7 | N/A | N/A |
| Section #2 temperature | C. | 69.7 | N/A | N/A |
| Section #3 hold-up time | sec | 3.1 | 3.1 | 3.1 |
| Section #3 temperature | C. | 30.3 | 28.4 | 23.6 |
| Co-Catalyst injection point location | | CSTR Feed | Torpedo Section #3 | Torpedo Section #3 |
| Polymer Analysis | | | | |
| Density | g/cc | 0.9210 | 0.9208 | 0.9210 |
| MI | g/10 min | 1.12 | 0.94 | 1.00 |
| S. Ex | | 1.30 | 1.31 | 1.32 |

TABLE 4

Catalyst 2c and catalyst 9 performance under operation mode 2

|  | Units | Product 4 Catalyst 9 Comparative example 4 Values | Product 5 Catalyst 2c Values | Product 6 Catalyst 2c Values |
|---|---|---|---|---|
| Overall | | | | |
| Total flow to CSTR and tubular reactor | kg/hr | 600.1 | 600.0 | 549.9 |

TABLE 4-continued

Catalyst 2c and catalyst 9 performance under operation mode 2

|  | Units | Product 4 Catalyst 9 Comparative example 4 Values | Product 5 Catalyst 2c Values | Product 6 Catalyst 2c Values |
|---|---|---|---|---|
| Overall ethylene conversion | % | 92.2 | 91.7 | 91.4 |
| Overall Polymer Production Rate (based on heat/mass balance) | kg/hr | 83.8 | 92.6 | 81.0 |
| Overall Polymer conc | % | 13.9 | 15.4 | 14.6 |
| FE Split | ratio | 80/20 | 80/20 | 80/20 |
| FC Split | ratio | 100/0 | 100/0 | 100/0 |
| CSTR conditions |  |  |  |  |
| Total flow to CSTR | kg/hr | 552.8 | 546.9 | 503.5 |
| Ethylene feed conc. to CSTR | wt % | 12.0 | 13.6 | 12.9 |
| 1-octene/ethylene ratio in CSTR feed | wt/wt | 0.45 | 0.40 | 0.42 |
| hydrogen conc in CSTR feed | ppm | 1.00 | 1.00 | 1.00 |
| Primary Feed Temp to CSTR | C. | 30.0 | 30.0 | 30.0 |
| CSTR Mean Temp | C. | 182.1 | 199.2 | 192.8 |
| Ethylene conversion at CSTR outlet | % | 89.9 | 90.0 | 90.0 |
| CSTR Agitator Speed | rpm | 900.0 | 900.0 | 900.0 |
| CSTR Polymer production rate (based on heat/mass balance) | kg/hr | 66.0 | 73.3 | 64.4 |
| Tubular Reactor conditions |  |  |  |  |
| Tubular reactor volume | % CSTR | 82.0 | 82.0 | 82.0 |
| Total flow to tubular reactor | kg/hr | 47.8 | 53.1 | 46.4 |
| Ethylene feed conc. to tubular reactor | wt % | 13.8 | 15.5 | 14.8 |
| hydrogen conc in tubular reactor feed | ppm | 0.5 | 0.5 | 0.5 |
| Tubular reactor feed temperature | C. | 129.4 | 129.4 | 130.1 |
| Tubular reactor Outlet Temperature | C. | 212.8 | 230.3 | 222.7 |
| Ethylene conversion at tubular reactor outlet | % | 72.3 | 70.6 | 69.3 |
| Tubular reactor polymer production rate (based on heat/mass balance) | kg/hr | 17.8 | 19.3 | 16.6 |
| Catalyst Ratios and conditions |  |  |  |  |
| Catalyst concentration in CSTR | ppm Ti | 1.14 | 0.75 | 0.58 |
| Cl/Mg ratio | mol/mol | 2.01 | N/A | N/A |
| Al/Ti ratio | mol/mol | 1.35 | 1.60 | 2.45 |
| $Et_3Al/Ti$ ratio | mol/mol | 0.35 | N/A | N/A |
| Catalyst Productivity | wt/wt | 7,755 | 9,954 | 12,220 |
| Co-Catalyst Productivity | wt/wt | 175,295 | 250,354 | 200,712 |
| Catalyst Torpedo Data |  |  |  |  |
| Section #1 hold-up time | sec | 31.9 | N/A | N/A |
| Section #1 temperature | C. | 64.8 | N/A | N/A |
| Section #2 hold-up time | sec | 14.9 | N/A | N/A |
| Section #2 temperature | C. | 70.2 | N/A | N/A |
| Section #3 hold-up time | sec | 3.1 | 3.1 | 3.1 |
| Section #3 temperature | C. | 29.8 | 24.7 | 23.7 |
| Co-Catalyst injection point location |  | CSTR feed | CSTR feed | CSTR feed |
| Polymer Analysis |  |  |  |  |
| Density | g/cc | 0.9215 | 0.9205 | 0.9213 |
| MI | g/10 min | 0.98 | 1.04 | 1.05 |
| S. Ex |  | 1.33 | 1.32 | 1.32 |

Polymer Properties

The Product 5 was further characterized by GPC-FT-IR and TREF for CDBI. The GPC-FT-IR showed relatively flat comonomer incorporation and CDBI of the product 5 from catalyst 2c was 58.4.

Films were prepared from product 2, 3, 5 and 6 as well as product 1 and 4 from comparative examples 3 and 4. The films were manufactured on a conventional blown film line which was fed by a single screw extruder having a 2.5 inch screw diameter. The extruder was driven by an electrical motor. Conventional additives (antioxidants and process aid) were added to all extrusions. The extrudate was forced through a circular die having a four inch diameter and a 35 mil die gap. A blow up ratio (BUR) of 2.5:1 was used to prepare the film with output rate of 100 lbs/hr. For 1 mil Films, the film properties (e.g. dart impact, 1% secant modulus, MD tear, TD tear, haze and hexane extractable) of product 2, 3, 5 and 6 as well as product 1 and 4 in the comparative example 3 and 4 are essentially same (within experimental errors).

What is claimed is:

1. A procatalyst for polymerization of ethylene and α-olefins on a delta form $MgCl_2$ support comprising a $Ti^{3+}$ complex of the formula $TiCl_3*[[R^4]_a[R^5O]_bAlX_{3-c}]_d$ wherein a is 0 to 1;

b is 0 to 1;

c=a+b;

d is from about 0.33 to about 1.0;

each $R^4$ and $R^5$ is independently selected from $C_{1-8}$ alkyl radicals;

each X is independently selected from the halogen radicals;

the Mg/Ti molar ratio is from about 5 to about 10;

and further wherein at least 60% of the total Ti present is in the $Ti^{3+}$ oxidation state.

2. The procatalyst of claim 1, wherein X is Cl.

3. The procatalyst of claim 1, wherein a is 0 and b is 0.

4. The procatalyst of claim 1, wherein a is 0 and b is 1.

5. The procatalyst of claim 1, wherein a is 1 and b is 0.

6. The procatalyst of claim 1, wherein each $R^5$ is ethyl.

7. The procatalyst of claim 1, wherein the Mg/Ti ratio is from about 5 to about 8.

8. The procatalyst of claim 1, wherein the $Ti^{3+}$ complex is $TiCl_3*[OEtAlCl_2]_d$, and the Mg/Ti molar ratio is from about 5 to about 8.

9. The procatalyst of claim 1, wherein the $Ti^{3+}$ complex is $TiCl_3*[ClAlCl_2]_d$, and the Mg/Ti molar ratio is from about 5 to about 8.

10. The procatalyst of claim 1, wherein the EPR spectrum and its simulation of the procatalyst has a characteristic g value of 1.950.

11. The procatalyst of claim 1, wherein electron paramagnetic resonance (EPR) indicates the presence of a species C, wherein the species C is associated with a tetrahedral $Ti^{3+}$ species and wherein species C is about 0.2% or more of the $Ti^{3+}$ species detected in the EPR spectra.

12. The procatalyst of claim 1, wherein electron paramagnetic resonance (EPR) indicates the presence of a species C, wherein the species C is associated with a tetrahedral $Ti^{3+}$ species and wherein species C is about 0.3% to about 1% of the $Ti^{3+}$ species detected in the EPR spectra.

13. A process to prepare an olefin polymerization procatalyst comprising a $Ti^{3+}$ complex, said process comprising:

a) forming a delta form $MgCl_2$ species by combining
   i) $R_2Mg$ in a solvent selected from $C_{5-12}$ alkanes, and
   ii) reactive organic chloride or HCl;
   wherein each R is independently selected from $C_{2-8}$ alkyl radicals,
   and wherein the mole ratio of added Cl and Mg is from about 2.0 to about 3.0;

b) adding to said delta form $MgCl_2$ species prepared in step a) either
   i) $R^1_xAlX_{3-x}$ and a tetravalent titanium compound in any order or at the same time,
   wherein the Al/Ti molar ratio is from about 3 to about 10; or
   ii) an aluminum alkyl halide of the formula $R^1_xAlX_{3-x}$ first, a tetravalent titanium compound second, followed by an alkyl aluminum alkoxide of the formula $R^4_yAlOR^5_{3-y}$, wherein the Al/Ti molar ratio when measuring Al supplied from $R^1_xAlX_{3-x}$ only is from about 0.7 to about 2 and the Al/Ti molar ratio when measuring Al supplied from $R^4_yAlOR^5_{3-y}$ is from about 1 to about 2;

and further wherein the Mg/Ti molar ratio is from about 5 to about 10;

x is 1 or 2;

y is 1 or 2;

each $R^1$ is independently selected from $C_{1-8}$ alkyl radicals;

the tetravalent titanium compound is selected from $TiR^2X_3$, $Ti(OR^3)X_3$, $TiX_4$, and mixtures thereof;

each X is independently selected from the halogen radicals;

each $R^2$ is independently selected from $C_{1-8}$ alkyl radicals and benzyl; and each $R^3$, $R^4$ and $R^5$ are independently selected from $C_{1-8}$ alkyl radicals.

14. The process of claim 13, wherein the reactive organic chloride is tertiary-butylchloride (tBuCl).

15. The process of claim 13, wherein step a) is performed at a temperature between about 20° C. and about 160° C.

16. The process of claim 13, wherein step b) or c) is performed at a temperature between about 40° C. and 90° C.

17. The process of claim 13, wherein $R_2Mg$ is selected from butylethyl magnesium (BEM), dibutyl magnesium, and butyloctyl magnesium (BOM).

18. The process of claim 13, wherein the solvent is decane.

19. The process of claim 13, wherein the Cl/Mg mole ratio is from about 2.15 to about 2.5.

20. The process of claim 13, wherein $R^1_xAlX_{3-x}$ is selected from isobutylaluminum dichloride (IBADC), ethylaluminumdichloride.

21. The process of claim 13, wherein the tetravalent titanium compound is $TiCl_4$.

22. The process of claim 13, wherein $R^4_yAlOR^5_{3-y}$ is diethylaluminumethoxide.

23. A procatalyst product comprising a $Ti^{3+}$ complex prepared by the process of claim 13.

24. A solution olefin polymerization process comprising i) adding to one or more continuous stirred tank reactor (CSTR), optionally followed by a tubular reactor, either in series or parallel, a solvent selected from $C_{5-12}$ alkanes, or mixtures thereof, and a procatalyst for polymerization on a delta form $MgCl_2$ support comprising a $Ti^{3+}$ complex of the formula $TiCl_3*[[R^4]_a[R^5O]_bAlX_{3-c}]_d$ wherein a is 0 to 1;

b is 0 to 1;

c=a+b;

d is from 0.33 to 1.0;

each $R^4$ and $R^5$ is independently selected from $C_{1-8}$ alkyl radicals;

each X is independently selected from the halogen radicals;

wherein at least 60% of the total Ti present is in the $Ti^{3+}$ oxidation state;

ii) adding ethylene, hydrogen and optionally one or more comonomers selected from $C_{3-8}$ comonomers to the reactor; and iii) adding an aluminum alkyl activator to the reactor in a molar ratio of about 1 to about 10 relative to the amount of procatalyst.

25. The polymerization process of claim 24, wherein the activator is an aluminum alkyl activator selected from diethylaluminumethoxide and trialkyl aluminum compounds, and MAO.

26. The polymerization process of claim 24, wherein the solvent is isohexane or decane.

27. The polymerization process of claim 24, wherein the polymerization temperature is at least about 240° C.

28. The polymerization process of claim 24, wherein the polymerization results in a polymer having the same density but where the process uses at least about 10% less comonomer feed compared to a polymerization process using a procatalyst for polymerization that contains substantially no tetrahedral $Ti^{3+}$ species.

29. The polymerization process of claim 24, wherein the polymerization results in a polymer with the same density but with a higher Mw at any polymerization temperature than the Mw obtained for a polymer prepared using a procatalyst for polymerization that contains substantially no tetrahedral $Ti^{3+}$ species.

30. The polymerization process of claim 24, wherein the reactor hold-up time is from about 30 seconds to about 5 minutes.

* * * * *